(12) United States Patent
Ludwig

(10) Patent No.: US 8,812,163 B2
(45) Date of Patent: *Aug. 19, 2014

(54) MULTI-CHANNEL CHEMICAL TRANSPORT BUS WITH BUS-ASSOCIATED SENSORS FOR MICROFLUIDIC AND OTHER APPLICATIONS

(75) Inventor: Lester F. Ludwig, Belmont, CA (US)

(73) Assignee: Lester F. Ludwig, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/251,288

(22) Filed: Oct. 3, 2011

(65) Prior Publication Data

US 2012/0022705 A1    Jan. 26, 2012

Related U.S. Application Data

(63) Continuation of application No. 12/328,716, filed on Dec. 4, 2008, now Pat. No. 8,032,258.

(60) Provisional application No. 61/005,429, filed on Dec. 4, 2007.

(51) Int. Cl.
    *G05D 7/06* (2006.01)
    *G05B 21/02* (2006.01)

(52) U.S. Cl.
    USPC ............................ 700/282; 700/9; 700/283

(58) Field of Classification Search
    USPC ........ 700/9, 19, 281, 282, 283; 137/2, 3, 7, 8, 137/9, 485, 487.5
    See application file for complete search history.

(56) References Cited

U.S. PATENT DOCUMENTS

| | | | | |
|---|---|---|---|---|
| 4,852,802 A | * | 8/1989 | Iggulden et al. | 239/64 |
| 5,040,409 A | * | 8/1991 | Kiewit | 73/40.5 A |
| 5,469,284 A | * | 11/1995 | Haas | 398/54 |
| 5,865,206 A | * | 2/1999 | Steigman et al. | 137/7 |
| 5,893,393 A | * | 4/1999 | Erdkamp et al. | 137/625.47 |
| 5,965,410 A | * | 10/1999 | Chow et al. | 435/91.2 |
| 6,136,555 A | * | 10/2000 | Jones | 435/41 |
| 6,174,675 B1 | * | 1/2001 | Chow et al. | 435/6.19 |
| 6,314,979 B1 | * | 11/2001 | Lips | 137/3 |
| 6,319,469 B1 | * | 11/2001 | Mian et al. | 422/64 |
| 6,425,414 B2 | * | 7/2002 | Jorgensen et al. | 137/597 |
| 6,537,799 B2 | * | 3/2003 | Chow et al. | 435/285.2 |
| 6,548,263 B1 | * | 4/2003 | Kapur et al. | 506/32 |
| 6,875,619 B2 | * | 4/2005 | Blackburn | 506/9 |
| 6,947,810 B2 | * | 9/2005 | Skinner | 700/283 |
| 7,010,391 B2 | * | 3/2006 | Handique et al. | 700/266 |

(Continued)

*Primary Examiner* — Charles Kasenge
(74) *Attorney, Agent, or Firm* — Procopio, Cory, Hargreaves & Savitch LLP

(57) ABSTRACT

A controllable multiple-channel chemical transport bus routes and transports fluids, gasses, aerosols, slurries and the like within a larger system. The system and methods are applicable for use in Lab-on-a-Chip (LoC) technology, and can be useful in the implementation of reconfigurable LoC devices. Routes through the bus are determined by control signals and/or sequences of control signals issued under algorithmic control. Several independent flows may occur simultaneously. Adaptations of Clos, Banyan, and other related multi-stage switching architectures in the flow topology can be supported. Sensors are placed at various locations along bus path segments. Information gathered by the sensors can be used for one or more of controlling measured flows, clearing operations, cleaning operations, and control of the timing flow transport. The sensors can be of one or more types such as presence sensors, flow sensors, pressure sensors, temperature sensors, conductivity sensors, optical sensors, ion sensors, and affinity sensors.

18 Claims, 33 Drawing Sheets

(56) References Cited

U.S. PATENT DOCUMENTS

| | | | |
|---|---|---|---|
| 7,160,687 B1* | 1/2007 | Kapur et al. | 435/7.2 |
| 7,214,320 B1* | 5/2007 | Gregori et al. | 210/656 |
| 7,261,812 B1* | 8/2007 | Karp et al. | 210/198.2 |
| 7,311,116 B2* | 12/2007 | Lillis | 137/256 |
| 7,329,388 B2* | 2/2008 | Guzman | 422/82.01 |
| 7,470,518 B2* | 12/2008 | Chiu et al. | 435/7.1 |
| 7,517,498 B2* | 4/2009 | Fredrick | 422/560 |
| 7,563,614 B2* | 7/2009 | Orwar et al. | 435/286.2 |
| 7,806,137 B2* | 10/2010 | Larson et al. | 137/597 |
| 7,987,022 B2* | 7/2011 | Handique et al. | 700/266 |
| 8,007,724 B2* | 8/2011 | Guzman | 422/82.01 |
| 8,007,725 B2* | 8/2011 | Guzman | 422/82.01 |
| 8,032,258 B2* | 10/2011 | Ludwig | 700/282 |
| 8,041,516 B2* | 10/2011 | Angell et al. | 702/23 |
| 2001/0005489 A1* | 6/2001 | Roach et al. | 422/99 |
| 2002/0143437 A1* | 10/2002 | Handique et al. | 700/266 |
| 2002/0186263 A1* | 12/2002 | O'Connor et al. | 346/7 |
| 2005/0013732 A1* | 1/2005 | Battrell et al. | 422/58 |
| 2005/0042768 A1* | 2/2005 | Fredrick | 436/174 |
| 2006/0030951 A1* | 2/2006 | Davlin et al. | 700/3 |
| 2006/0036348 A1* | 2/2006 | Handique et al. | 700/266 |
| 2006/0078961 A1* | 4/2006 | Chiu et al. | 435/29 |
| 2006/0223164 A1* | 10/2006 | Orwar et al. | 435/286.4 |
| 2006/0234298 A1* | 10/2006 | Chiu et al. | 435/7.1 |
| 2007/0130935 A1* | 6/2007 | Stephenson et al. | 60/484 |
| 2007/0275193 A1* | 11/2007 | DeSimone et al. | 428/34.1 |
| 2009/0121476 A1* | 5/2009 | Malito et al. | 285/124.4 |

\* cited by examiner

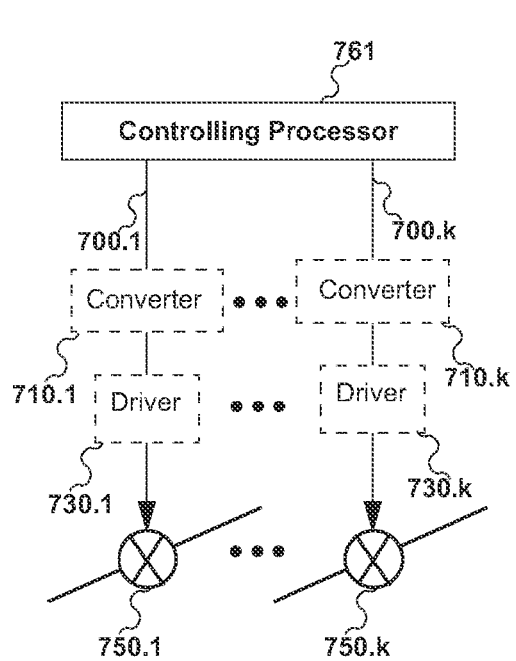
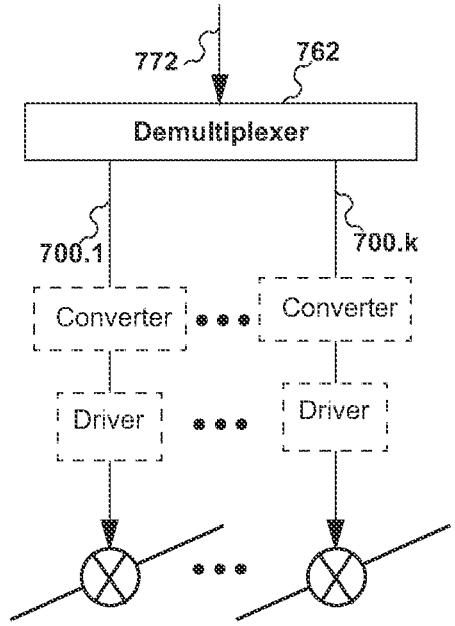
Figure 7a
Figure 7b
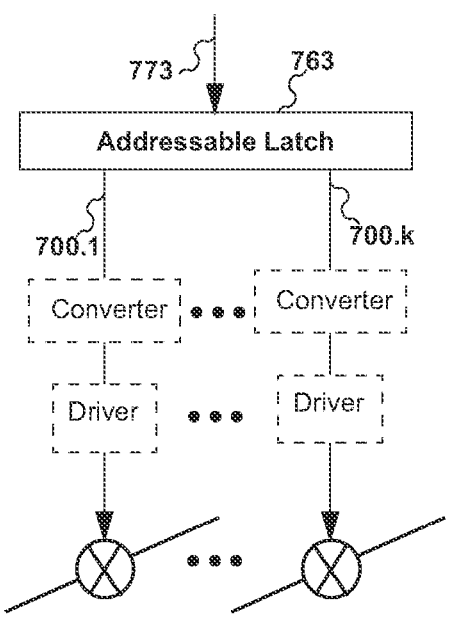
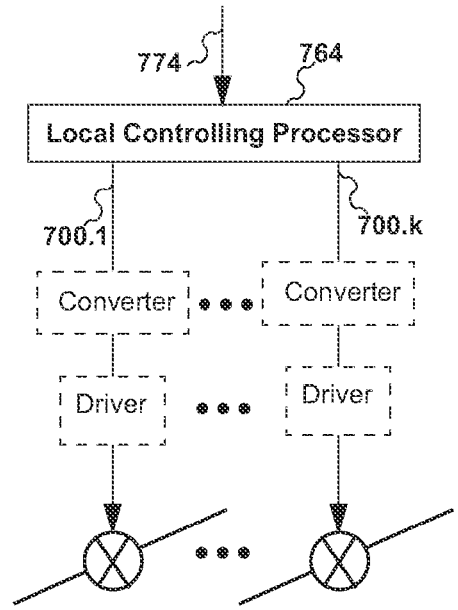
Figure 7c
Figure 7d

MULTI-CHANNEL CHEMICAL TRANSPORT BUS WITH BUS-ASSOCIATED SENSORS FOR MICROFLUIDIC AND OTHER APPLICATIONS

CROSS REFERENCE TO RELATED APPLICATIONS

This application is a continuation of U.S. patent application Ser. No. 12/328,716, now U.S. Pat. No. 8,032,258, filed on Dec. 4, 2008 and issued on Oct. 4, 2011, and pursuant to 35 U.S.C. Section 119(e), claiming benefit of priority from provisional patent application Ser. No. 61/005,429, filed Dec. 4, 2007, the contents of which are hereby incorporated by reference herein in their entirety.

BACKGROUND OF THE INVENTION

1. Field of Invention

The present invention generally relates to the controllable routing and transport of fluids, gasses, and slurries, and in particular, to multiple input/multiple output chemical transport.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

One embodiment includes a system for implementing an electrically-operated multi-channel chemical transport bus. This system includes a plurality of chemical flow ports, each chemical flow port connected to at least one associated first electrically-operated valve and further in chemical flow communication with at least one associated second electrically-operated valve; a first chemical flow bus line connecting with each first electrically-operated valves respectfully associated with each chemical flow port from the plurality of chemical flow ports, each connection made at an associated tap in the first chemical flow bus line, the first chemical flow bus line further comprising a first pair of additional electrically-operated valves, one on either side of at least one tap of the associated tap in the first chemical flow bus line; a second chemical flow bus line connecting with each second electrically-operated valves respectfully associated with each chemical flow port from the plurality of chemical flow ports, each connection made at an associated tap in the second chemical flow bus line, the second chemical flow bus line further comprising a second pair of additional electrically-operated valves, one on either side of at least one tap of the associated tap in the second chemical flow bus line; and a controller for selectively controlling the operation of each of the electrically-operated valves, the controller controlling communications with each of the electrically-operated valves. The controller further controls the electrically-operated valves to: prevent chemical flows between a first and second chemical flow ports of the plurality of chemical flow ports; transport chemical flows between a first and second chemical flow ports of the plurality of chemical flow ports, wherein the transported chemical flow does not extend into the chemical flow bus line beyond at least the first or the second pair of additional valves; and again prevent chemical flows between a first and second chemical flow ports of the plurality of chemical flow ports.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIG. 7a depicts a first exemplary arrangement for providing control signals to a collection of k controllable valves via a controlling processor.

FIG. 7b depicts a second exemplary arrangement for providing control signals to a collection of k controllable valves via a demultiplexer that demultiplexes an incoming control signal.

FIG. 7c depicts a third exemplary arrangement for providing control signals to a collection of k controllable valves via an addressable latch responsive to an incoming control signal.

FIG. 7d depicts a fourth exemplary arrangement for providing control signals to a collection of k controllable valves via a local controlling processor responsive to an incoming control signal and/or other communications.

FIG. 19b shows an exemplary gated path through the port bus column of FIG. 19a.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

In microprocessor and other computer-based systems, an electrical bus, computer bus, data bus, etc. (often referred to herein as simply a bus), provides an interface where a plurality of associated or attached devices are able to share a common transaction environment. Such a bus is typically used to transfer data signals, control signals, and power among attached electrical and information devices.

In some applications, the bus provides a mechanism for adding and removing component subsystems. In these as well as other applications, the bus may be used to distribute data, control, and/or power to various subsystems within a larger system. Of the latter, a bus may be used within a circuit board or within an integrated circuit.

Although there are distinct differences and many special considerations and provisions that must be provided, various embodiments of the present invention adapt this concept of a bus to provide methods and systems for the controlled transfer of fluids, gases, slurries, and the like within a larger system such as a micro-fluidic Lab-on-a-Chip (LoC) device, chemical instrumentation package, etc.

More specifically, such embodiments are directed to a variety of methods and systems relevant to the creation of sophisticated and/or high-performance chemical transport buses such as that which may be used in LoC devices, larger-scale chemical systems, and devices that emulate these. Such embodiments may be very useful in the implementation of software-reconfigurable chemical process systems, such as those described in U.S. patent application Ser. No. 11/946,678, filed Nov. 28, 2007. Moreover, these embodiments may additionally be very useful in the implementation software-controlled physical emulation systems and methods such as those taught in a companion provisional patent application Ser. No. 61/005,369, filed Dec. 4, 2007.

In view of the differences and many special considerations and provisions that are typically provided in order to achieve a chemical transport bus providing controlled transfer of fluids, gases, slurries, and the like within a larger system, the basic principles of an electrical or optical signal bus, timing bus, and/or electrical powering bus will not always be directly adopted. Rather, a chemical transport bus may be constructed using alternative concepts and principles.

Basic Frameworks for a Controllable Multi-channel Chemical Transport Bus

Figure 1A:
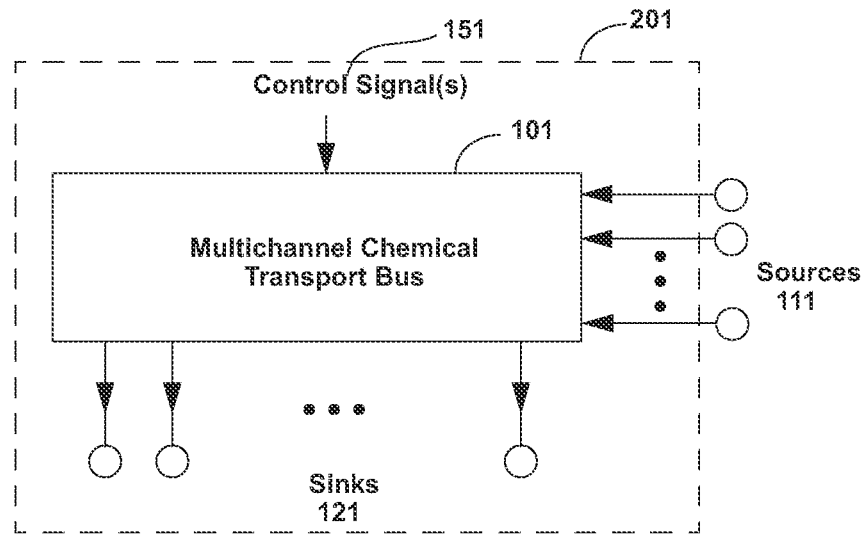
FIG. 1a shows a first illustrative example of a unidirectional flow Multi-channel Chemical Transport Bus for use in controlled unidirectional transfer of chemical substances from a plurality of originating sources outside of a system to a plurality of destination sinks within the system.

FIG. 1a shows a first illustrative example of a unidirectional flow Multi-channel Chemical Transport Bus (MCTB) 101 for use in controlled unidirectional transfer of chemical substances from a plurality 111 of origin sources (depicted in the figure as a vertical column of small circles, each small circle representing an individual source within the plurality 111 of sources) that are interfaced outside of a system 201. Chemical substances provided by the sources are transferred to a plurality 121 of destination sinks (depicted in the horizontal row of small circles, each small circle representing an individual sink within the plurality 121 of sinks) within the system 201. The individual sinks 121 making up the plurality 121 of sinks may be local devices or subsystems included in the system 100. In principle, the chemical substances may include one or more of various types of liquids, gases, slurries, aerosols, as well as mixtures of these.

In this example, each of the sources comprised by the plurality 111 of sources are typically in some manner distinct from one another and the routing of transport is controlled by one or more control signal(s) 151. The control signals 151 may be of one or more types, for example electrical, optical, pneumatic, chemical, acoustic, magnetic, radio-frequency electromagnetic, etc., as may be advantageous in an application or implementation. The control signals may be primitive on-off, pulse-width modulated, analog, etc., and individual routing controls may be rendered with various types of signal and interface organizations (for example multiplexed, space-division, ACSII, I²C, etc.) as may be advantageous in an application or implementation.

In some embodiments it may be helpful to limit cross-contamination within the Multi-channel Chemical Transport Bus (MCTB) 101 chemical substances provided by the plurality 111 of sources. In other embodiments, this cross-contamination condition may be more relaxed, particularly during transitions where first one and later another of the chemical substances provided by the plurality 111 of sources are selectively provided to the same individual sink from the plurality of sinks (destinations) 121. In other embodiments, the Multi-channel Chemical Transport Bus (MCTB) 101 may internally mix two or more of the chemical substances provided by the sources 111. In these embodiments, such mixing may be realized as simple on-off flow control, pulse-width modulated on-off flow control, proportional flow control, etc. as may be advantageous in an application or implementation. Further, such mixing may be sequenced or involve at least some time interval of simultaneous flow.

Figure 1B:
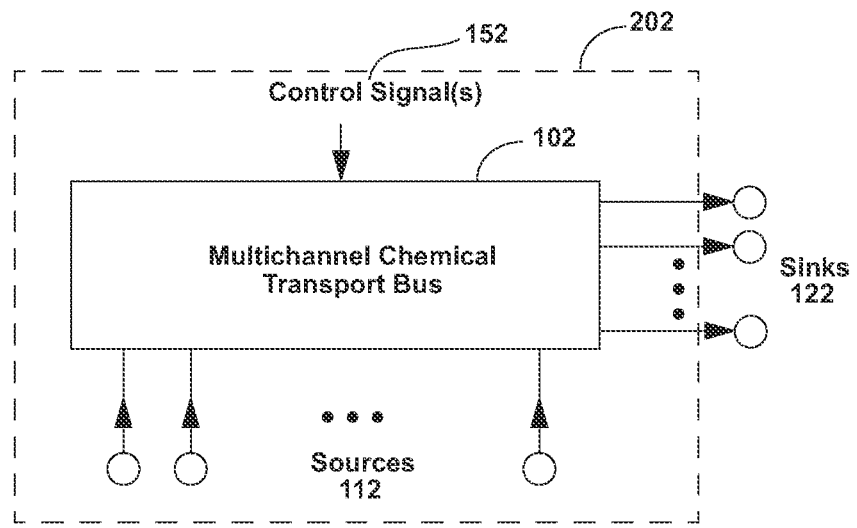
FIG. 1b shows a second illustrative example of a unidirectional flow Multi-channel Chemical Transport Bus similar to that depicted in FIG. 1a but configured to provide transport flows in the opposite direction.

FIG. 1b shows a second example of a unidirectional flow Multi-channel Chemical Transport Bus (MCTB) 102 incorporated into a system 202 similar to that depicted in FIG. 1a, but herein is configured to provide all the depicted transport flows in the opposite direction. In this example, chemical substances can originate from any of a plurality 112 of sources within the system and transferred, as directed by control signals 152, to any of a plurality 122 of sinks or paths outside the system 202.

Figure 2A:
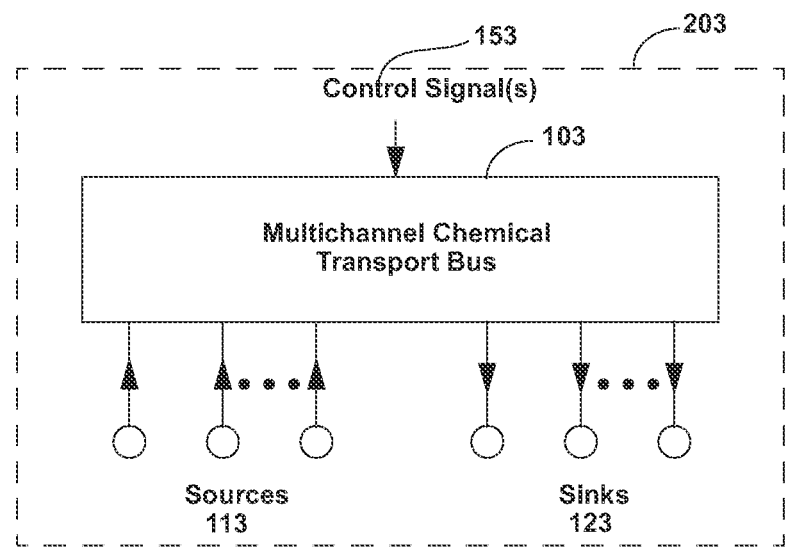
FIG. 2a shows a third illustrative example of a unidirectional flow Multi-channel Chemical Transport Bus where some elements within the system act as sources while other elements within the system act as sinks.

FIG. 2a shows a third example of a unidirectional flow Multi-channel Chemical Transport Bus (MCTB) 103, directed by control signals 153, wherein some devices, subsystems, or other elements within the system 203 act as sources 113 while other devices, subsystems, or other elements within the system 203 act as sinks 123. As there are no sources and/or sinks outside the system 203, the arrangement depicted in FIG. 2a will be referred to as closed. In contrast, each of the arrangements of FIGS. 1a and 1b in that they each involve sources and/or sinks outside the system 203, will be referred to as open.

Figure 2B:
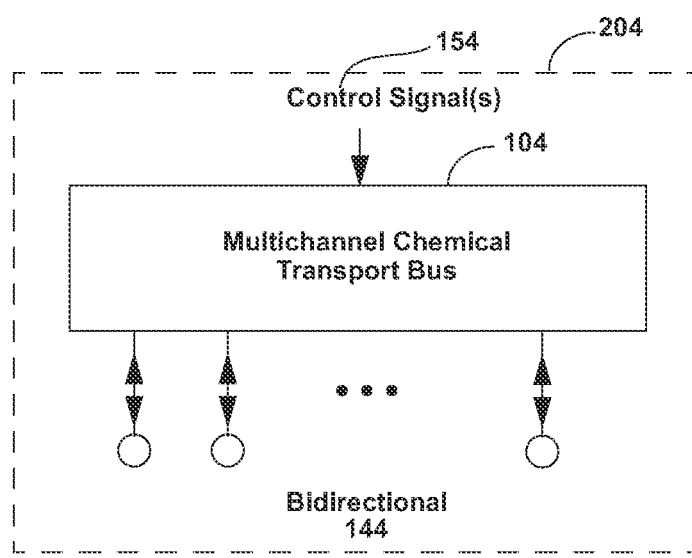
FIG. 2b shows an example of a Multi-channel Chemical Transport Bus wherein devices, subsystems, or other elements within the system act as both sources and as sinks.

FIG. 2b shows an example of a Multi-channel Chemical Transport Bus (MCTB) 104, directed by control signals 154, wherein devices, subsystems, or other elements 144 within the system 204 act as both sources and as sinks. In some embodiments the path linking the elements 144 with the Multi-channel Chemical Transport Bus (MCTB) 104 can be bidirectional. As there are no sources and/or sinks outside the system 204, the arrangement depicted in FIG. 2b is closed.

Figure 3A:
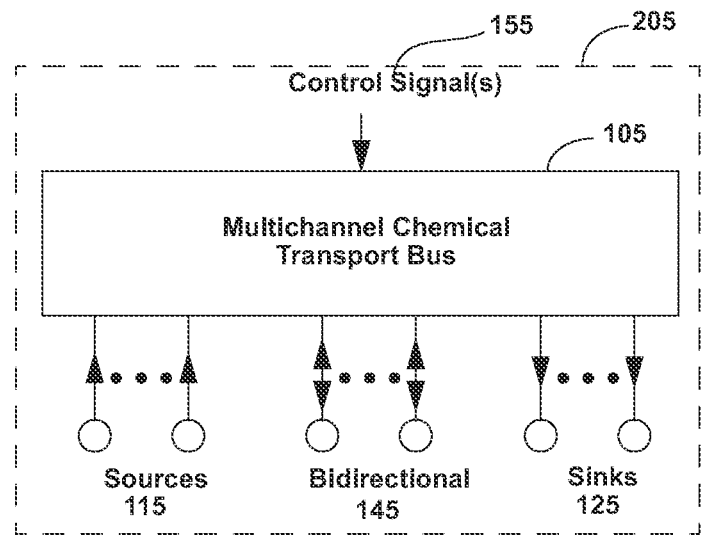
FIG. 3a shows an exemplary arrangement wherein a Multi-channel Chemical Transport Bus interfaces with some elements which are only sources, other elements which are only sinks, and yet other elements which may freely act as sources or sinks and in some embodiments connect to the bus with bidirectional paths.

FIG. 3a shows another example arrangement wherein the Multi-channel Chemical Transport Bus (MCTB) 105, directed by control signals 155, interfaces with some elements 115 which are only sources, other elements 125 which are only sinks, and yet other elements 145 which may freely act as sources or sinks and in some embodiments connect to the bus with bidirectional paths. It is clear to one skilled in the art that many variations of this exist wherein one system internal sources 115 or system internal sinks 125 may be omitted from the exemplary configuration depicted in FIG. 3a. Note that since there are no sources and/or sinks outside the system 205, the arrangement depicted in FIG. 3a is closed.

Figure 3B:
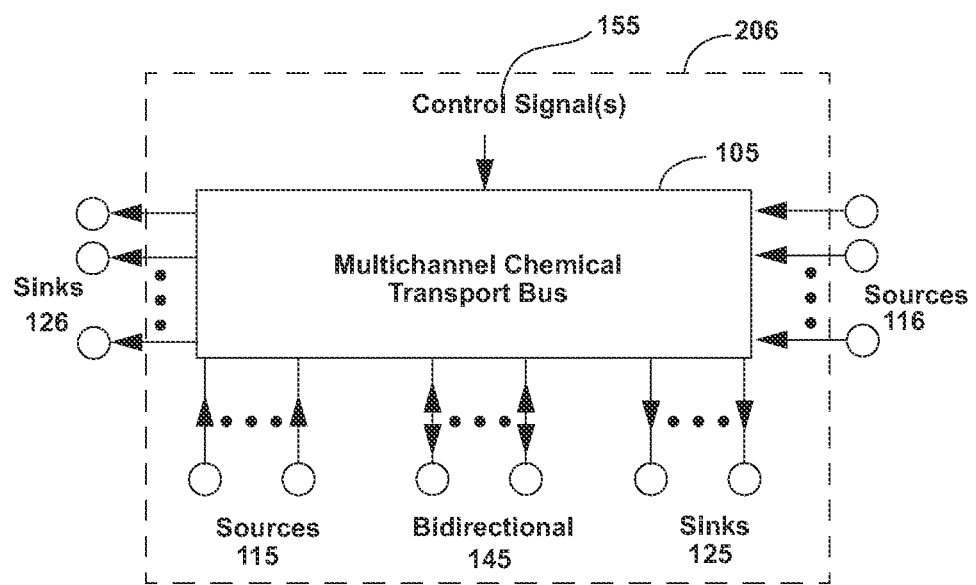
FIG. 3b shows an exemplary variation of the arrangement of FIG. 3a augmented to include sinks and/or sources outside the system.

FIG. 3b shows an exemplary variation of the arrangement of FIG. 3a which is augmented to include external sources 116 and external sinks 126 outside a system 206 as well as internal sources 115, internal sinks 125, and internal bidirectional elements 145 within the system 206. It is clear to one skilled in the art that many variations of this exist wherein one or more of the depicted system internal sources 115, system internal sinks 125, system internal bidirectional elements 145, system external sources 116, and/or system external sinks 126 may be omitted from the exemplary configuration depicted in FIG. 3b. Note that the arrangement depicted in FIG. 3b as shown is an open system, and any variations having at least one of external sources 116, external sinks 126 bidirectional paths 146 to elements outside the system 206 are also open system.

Figure 3C:
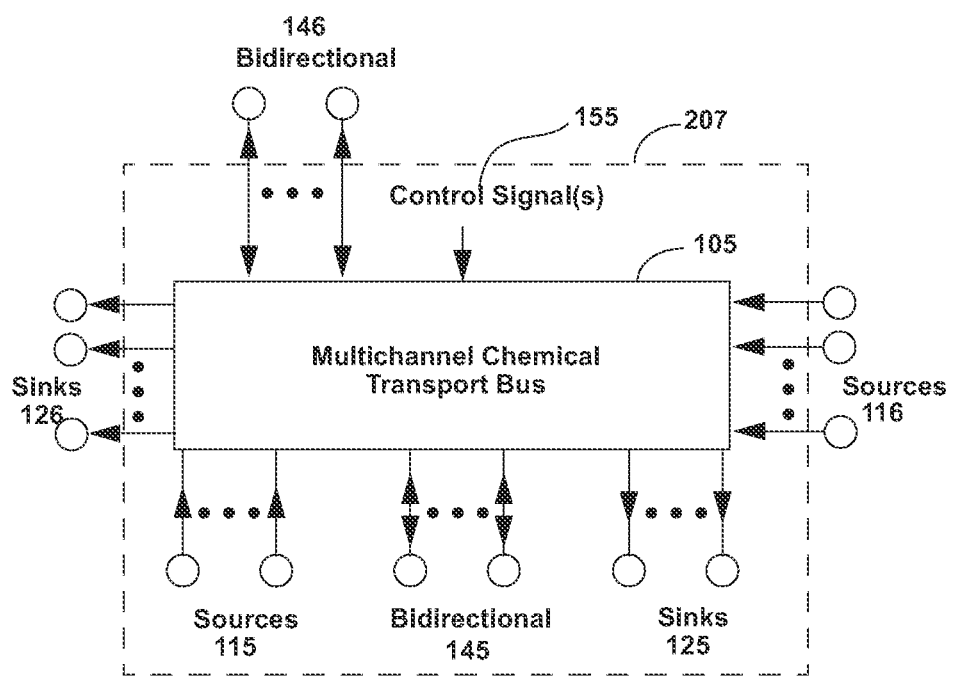
FIG. 3c shows an exemplary variation of the arrangement of FIG. 3b augmented to include bidirectional paths to elements outside the system.

As shown in FIG. 3c, bidirectional paths 146 to elements outside the system may also be provided in a similar fashion. It is clear to one skilled in the art that many variations of this exist wherein one or more of the depicted system internal sources 115, system internal sinks 125, system internal bidirectional elements 145, system external sources 116, and/or system external sinks 126 may be omitted from the exemplary configuration depicted in FIG. 3c. Note that the arrangement depicted in FIG. 3c as shown is an open system, and any variations having at least one of external sources 116, external sinks 126 bidirectional paths 146 to elements outside the system 207 are also open system.

Figure 4:
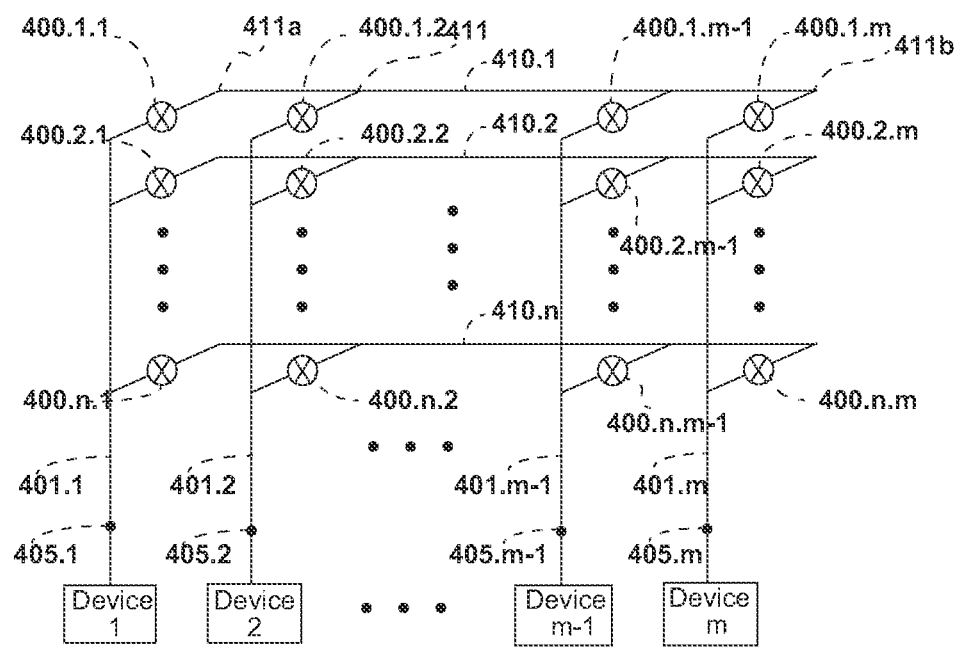
FIG. 4 shows a simple exemplary embodiment of a closed system (such as that depicted in the exemplary arrangements depicted FIG. 2a, 2b, or 3a), here realized by a plurality of tapped or branching transport paths and a plurality of on/off valves.

Exemplary Embodiments and Capabilities of a Controllable Closed-System Multi-channel Chemical Transport Bus FIG. 4 shows a simple exemplary embodiment of a closed Multi-channel Chemical Transport Bus arrangement such as that depicted in the exemplary arrangements depicted FIG. 2a, 2b, or 3a. The embodiment here is realized by a plurality of tapped or branching transport paths (m paths vertically 401.1-401.m and n paths horizontally 410.1-410.n), to be referred to as bus lines, and a plurality of n×m on/off valves 401.1-401.n.m. The of n×m on/off valves 401.1.1-401.n.m may be controlled by control signals such as those 153, 154, 155 of FIG. 2a, 2b, or 3a.

The example of FIG. 4 consists of m devices connecting to ports 405.1-405.m, each port terminating an associated tapped or branching path 401.1-401.m, wherein a port terminating the tapped or branching path 400.1 connects to Device 1, the port terminating the tapped or branching path 400.2 connects to Device 2 and so on, wherein the port terminating the tapped or branching path 401.m connects to Device m. In that proper operation of a pair of selected valves sharing the same horizontally tapped or branching path 410.1-410.n will allow any of the devices in the system to exchange chemical substances with any other device in the system, FIG. 4 is may be realized using any of the arrangements depicted in FIG. 2a, 2b, or 3a.

Figure 5A:
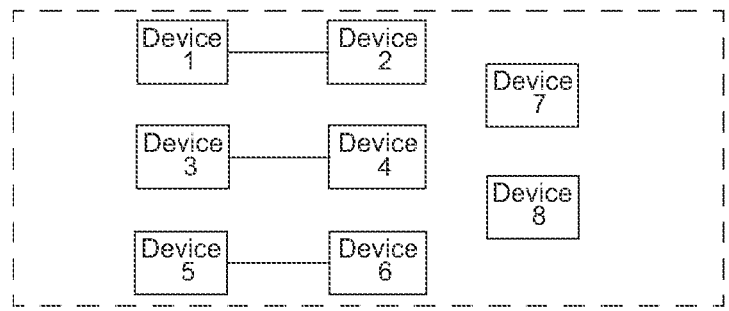
FIG. 5a depicts an exemplary configuration that can result from selected open and closed state assignment made to valves within an exemplary eight device embodiment of FIG. 4 wherein three pairs of devices are interconnected and two devices are isolated.
Figure 5B:
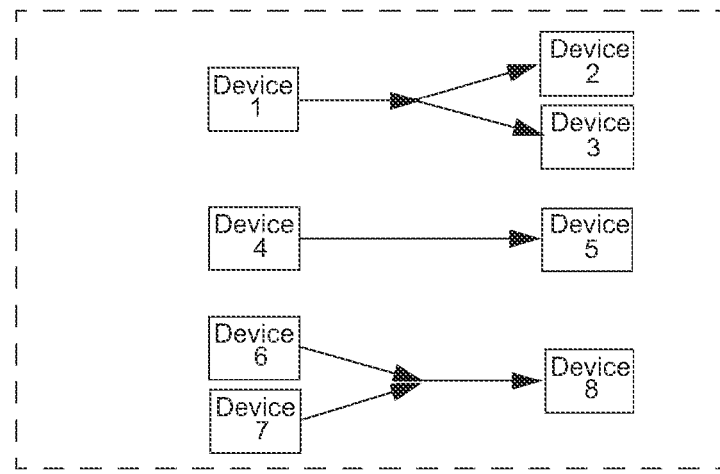
FIG. 5b depicts an exemplary configuration that can result from selected open and closed state assignment made to valves within an exemplary eight device embodiment of FIG. 4 comprising fan-out and mixing attributes.
Figure 5C:
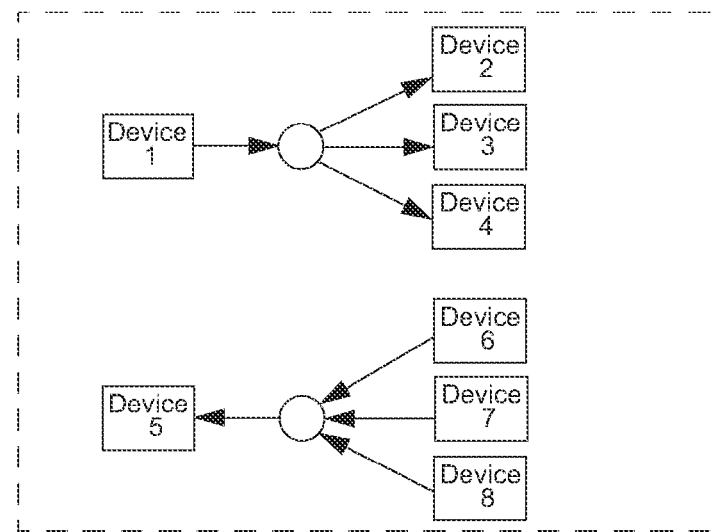
FIG. 5c depicts an exemplary configuration that can result from selected open and closed state assignment made to valves within an exemplary eight device embodiment of FIG. 4 comprising distribution valve and selection valve attributes.

The embodiment of FIG. 4 can be used to selectively interconnect the ports 405.1-405.m among one another responsive to the aforementioned control signals. This subsequently provides a controllable feature for selectively interconnecting the m devices to permit the exchange of chemical substances among the m devices. For example consider a system such as that depicted in any of FIG. 2a, 2b, or 3a with m=8. Responsive to control signals, various configurations can be obtained. Three examples are depicted in FIGS. 5a-5c, to be discussed next In a first example, consider the arrangement of FIG. 4 wherein, in response to control signals, the following valves are open:

400.1.1
    400.1.2
    400.2.3
    400.2.4
    400.3.5
    400.3.6 and all other valves are closed. The result is the configuration depicted in FIG. 5a wherein Device 1 is connected with Device 2, Device 3 is connected with Device 4, Device 5 is connected with Device 6, and Device 7 and Device 8 are not connected to any other of the devices. More generally, in this modality, the Multi-channel Chemical Transport Bus provides a controllable "point-to-point interconnection" operation. Depending on the nature and internal state of the individual devices, the chemical substance flows supported by the interconnections may be unidirectional in either direction or may be bidirectional.

In a second example, consider the arrangement of FIG. 4 wherein, in response to control signals, the following valves are open:

400.1.1
400.1.2
400.1.3
400.2.4
400.2.5
400.3.6
400.3.7
400.3.8 and all other valves are closed. The result is the configuration depicted in FIG. 5b wherein Device 1 is connected with both Device 2 and Device 3, Device 4 is connected with Device 5, and Device 8 is connected with both Device 6 and Device 7. As with the previous example, the chemical substance flows supported by the interconnections may be unidirectional in either direction or may be bidirectional. For additional points of illustration, the example depicted in FIG. 5b has flow directions as indicted by the arrows shown. Here, then, the flow from Device 1 is simultaneously directed to both Device 2 and Device 3; this situation creates a "fan-out" operation within the Multi-channel Chemical Transport Bus. Additionally, the flow from Device 6 and Device 7 are simultaneously directed to Device 8; this situation creates a "mixing" operation within the Multi-channel Chemical Transport Bus (although in microfludic flows formal diffusion-type mixing may not directly occur without additional provisions due to laminar phenomena intrinsic to most types of microchannels).

In a third example, consider the arrangement of FIG. 4 wherein, in response to control signals, the following first group of valves are each open:

400.1.1
400.2.5, individual valves in the following second group may be opened mutually exclusively in response to control signals:

400.1.2
400.1.3
400.1.4, and individual valves in the following third group may be opened mutually exclusively in response to control signals:

400.2.6
400.2.7
400.2.8 and all other valves are closed. As with the previous example, the chemical substance flows supported by the interconnections may be unidirectional in either direction or may be bidirectional. For additional points of illustration, the example depicted in FIG. 5c has flow directions as indicted by the arrows shown. The result is an arrangement wherein, responsive to controls signals, the flow from Device 1 can be distributed to any of Device 2, Device 3, or Device 4; this situation creates a controllable "distribution valve" operation within the Multi-channel Chemical Transport Bus. Additionally, the result also includes an arrangement wherein, responsive to controls signals, the flow from any of Device 6, Device 7, or Device 8 can be selected for flow into Device 5; this situation creates a controllable "selection valve" operation within the Multi-channel Chemical Transport Bus.

Thus, the Multi-channel Chemical Transport Bus embodiment provided in FIG. 4 can provide the following five controllable operations on chemical substance transport among the eight devices:

Controlled point-to-point interconnection operation,
Controlled fan-out operation,
Controlled mixing operation,
Controlled selection valve operation,
Controlled distribution valve operation.

A number of further extensions and refinements of the exemplary systems and methods described above are provided later in the description. Attention is directed to classification remarks made relating to the five exemplary operations described above.

The first of these classification remarks concern matters of distinguishing initial configuration, modal operation, and reconfiguration:

In many situations and applications, one or more of instances of one or more of the five types of Multi-channel Chemical Transport Bus operations listed above may be enacted prior to the operation of the associated larger system. This enactment establishes an initial configuration of the associated larger system.

In many situations and applications, one or more of instances of one or more of the last two types of Multi-channel Chemical Transport Bus operations listed above may be enacted during operation of the associated larger system. These enactments may be viewed as modal operation of the associated larger system within a previously established initial configuration.

In some situations and applications, one or more of instances of one or more of the first three types of Multi-channel Chemical Transport Bus operations listed above may be enacted during operation of the associated larger system.

In some contexts, particularly where minor variations result, these enactments may, too, be viewed as modal operation of the associated larger system.

In other contexts, particularly where significant variations or fundamental structural changes result, these enactments may instead be viewed as a reconfiguration of the associated larger system.

For example, should the connections between any one or more of the interconnect pairs of Devices 1-6 provided by the Multi-channel Chemical Transport Bus in FIG. 5a be interrupted during of the operation of associated larger system, the situation may be viewed as modal operation of the associated larger system. In contrast, should the interconnection and isolations of Devices 1-8 provided by the Multi-channel Chemical Transport Bus depicted in FIG. 5a be changed to become those depicted in FIG. 5b or 5c, the situation may be viewed as a reconfiguration of the associated larger system.

The second of these classification remarks concern matters of distinguishing selection versus mixing and distinguishing distribution versus fan-out:

A "controlled selection valve operation" involves at most one valve open at one time from among a group of valves sharing a tapped or branched path. A "controlled mixing operation" involves at least two or more valves open at one time from among a group of valves sharing a tapped or branched path.

A "controlled distribution valve operation" involves at most one valve open at one time from among a group of valves sharing a tapped or branched path. A "controlled mixing operation" involves at least two or more valves open at one time from among a group of valves sharing a tapped or branched path.

Next, it is noted that the number n bus lines 410.1-410.*n* determines the number of simultaneously available linkages available between devices. In reference to the earlier examples depicted in FIGS. 5*a*-5*c*:

The configuration depicted in FIG. 5*a* requires three interconnections, so n must be at least 3 in order to support this configuration. If n=3, then it is typically not possible to additionally connect Devices 7 and 8 as this would usually require four bus lines 410.1-410.4;

The configuration depicted in FIG. 5*b* requires three interconnections, so n must be at least 3 in order to support this configuration.

The configuration depicted in FIG. 5*c* requires two interconnections, so n must be at least 2 in order to support this configuration.

For realizing a particular configuration, the on/off state of individual valves may be fixed (so as to render a particular configuration) for an epoch of time or may vary over time (so as to change modes of operation or in a reconfiguration action transforming the larger system from one configuration to another). Typically the transition response time and settling time of the individual valves are desired to be as rapid as possible. Between transitions, the on/off state of individual valves will remain unchanged, often for relatively long periods of time.

Persistent-State and State-Transition Control

In some embodiments, the on/off state of individual valves is determined by whether ongoing energy is applied to the valve. For example, many types of solenoid valve (and their microfluidic equivalents) require an electric current to keep the valve in one state, and when the electric current stops the valve attains the opposite state. More specifically, a "normally closed" valve permits flow through it only when an electric current is applied, while a "normally open" valve blocks flow through it only when an electric current is applied. In many such embodiments employing these types of valves, current must be applied to at least some valves in order for the Multi-channel Chemical Transport Bus to be able to implement at least some, if not all, of the possible configurations (i.e., such as those depicted in FIGS. 5*a*-5*c*). Some implications include:

If all valves used in the realization of a Multi-channel Chemical Transport Bus are effectively "normally closed," then in the absence of power no non-trivial (i.e., everything isolated) configurations can typically be realized. In some applications this behavior may be advantageous, while in other applications this behavior can introduce additional design considerations or design problems.

In order for valve settings to be maintained, outside means (for example electrical logic circuitry such as flip-flops or other form of memory) must typically be provided to maintain valve state over time.

In other embodiments, individual valves used in the realization of a Multi-channel Chemical Transport Bus may be "bi-stable" or have other mechanical means or inherent attributes that allow a valve state to be retained in the absence of applied electrical current or other forms of energy or power. In such systems, electrical current or other forms of energy or power may be used to cause a valve element to change state. Use of these types of valve elements in realizing a Multi-channel Chemical Transport Bus with an approach such as that depicted in FIG. 4 allows a given configuration specified by control signals to be mechanically retained after removal of power to the larger associated system.

It is noted that a Multi-channel Chemical Transport Bus may be implemented with other types of valve elements.

Various example realizations of a Multi-channel Chemical Transport Bus employing an entirely different type of valve element will be provided later (for example, those to be described in conjunction with FIGS. 19*a*-19*d*), for example those of FIGS. 20*a*-20*b*.

Prior to this, attention is first directed to control signals, interfacing a Multi-channel Chemical Transport Bus structure such as that of FIG. 4 to external sources and sinks, and the management of waste and contamination within the bus lines comprised by the Multi-channel Chemical Transport Bus.

Attention is now directed to control signals that may be used to control a Multi-channel Chemical Transport Bus realization. As mentioned earlier, such control signals may include one or more types (for example electrical, optical, pneumatic, chemical, acoustic, magnetic, radio-frequency electromagnetic, etc.) as may be advantageous in an application or implementation. Further, control signals may be primitive on-off, pulse-width modulated, analog, etc., and individual routing controls may be rendered with various types of signal and interface organizations (for example multiplexed, space-division, ACSII, $I^2C$, etc.) as may be advantageous in an application or implementation. Additionally, control signals may be of two characters:

Persistent-state control signals which specify the instantaneous state for a target valve, or State-transition control signals which specify changes of state for a target valve.

Figure 6A:
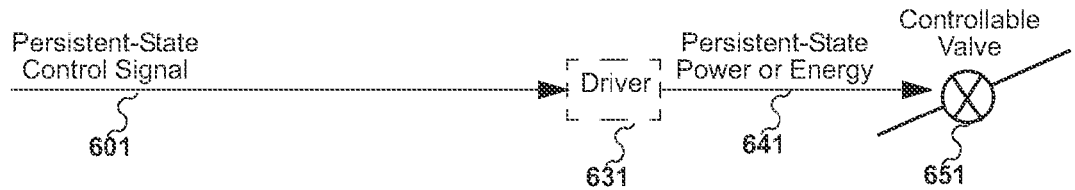
FIG. 6a depicts an example of a persistent-state control signal used to control a controllable valve. In some embodiments the driver may be omitted.

As an example of a persistent-state control signal, a control signal value associated with a logical "1" (for example, $+V_{DD}$ in CMOS or +5 volts in TTL) may cause a particular valve to open and remain open only as long as that control signal remains in the logical "1" state. Such a situation is shown by the arrangement depicted in FIG. 6*a*. Here an incoming persistent-state control signal 601 may be provided to a driver 631 which may convert, regenerate, and/or isolate the control signal into power or energy 641 used to maintain the state of a controllable valve 651. In some situations, the persistent-state control signal 601 itself may be such that it can directly provide power or energy 641 to directly maintain the state of a controllable valve 651; in this case the driver 631 may be omitted. Additionally, should the provided control signal intended to control the valve 653 not be compatible with the type of input signal needed for the flip-flop 613 (for example the provided control signal may be optical while the flip-flop 613 may require state-transition control signal 603 to be electrical), a conversion operation (not pictured) may be provided in order to produce a state-transition control signal 603 compatible with the input to the flip-flop 613.

Figure 6B:
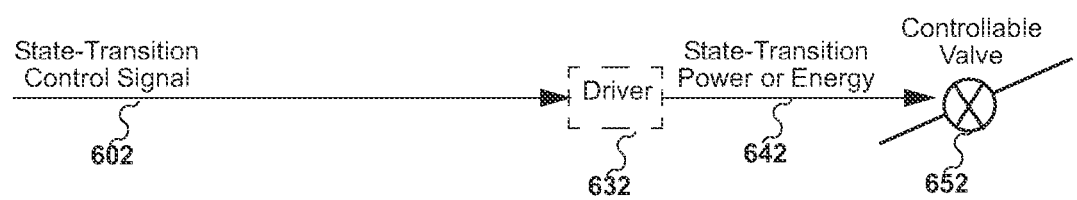
FIG. 6b depicts an example of a state-transition control signal used to control a controllable valve. In some embodiments the driver may be omitted.

As an example of a state-transition control signal, a control signal pulse or message of one type may cause a particular valve to open and remain open and a control signal pulse or message of another type may cause a particular valve to close and remain closed. Such a situation is shown by the arrangement depicted in FIG. 6*b*. Here an incoming state-transition control signal 602 may be provided to a driver 632 which may convert, regenerate, and/or isolate the control signal into power or energy 642 used to change the state of a controllable valve 652. In some situations, the persistent-state control signal 602 itself may be such that it can directly provide power or energy 642 to directly maintain the state of a controllable valve 652; in this case the driver 632 may be omitted. Additionally, should the provided control signal intended to control the valve 653 not be compatible with the type of input signal needed for the one-shot 614 (for example the provided control signal may be optical while the one-shot 614 may require persistent-state control signal 604 to be electrical), a conversion operation (not pictured) may be provided in order to produce a persistent-state control signal 604 compatible with the input to the one-shot 614.

Figure 6C:
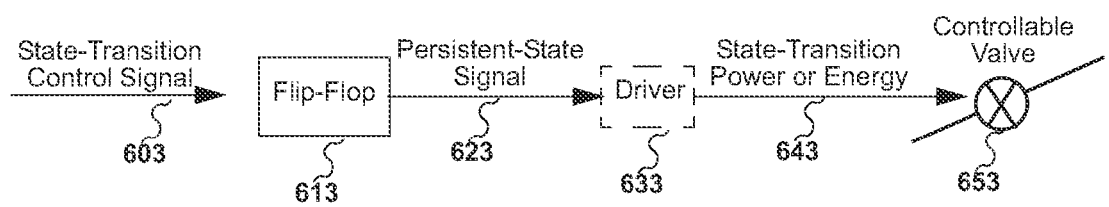
FIG. 6c depicts exemplary use of a flip-flop function to convert an incoming state-transition control signal into a persistent-state signal to maintain the state of a controllable valve. In some embodiments the driver may be omitted.

In some circumstances the control signal may be in the form of a state-transition control signal but the valve to be controlled requires a persistent-state control signal. In this case an additional conversion is required. FIG. 6c depicts an exemplary realization of this arrangement. Here an incoming state-transition control signal 603 may be provided to a flip-flop 613 function that retains the state value associated with the received value of the incoming state-transition control signal 603. The flip-flop 613 function subsequently can naturally provide a persistent-state signal 623 that may be applied or otherwise provided to a driver 633 which may convert and/or isolate the control signal into power or energy 643 used to maintain the state of a controllable valve 653. In some embodiments, the persistent-state signal 623 itself may be such that it can directly provide power or energy 643 to directly maintain the state of a controllable valve 653; in this case the driver 633 may be omitted.

Figure 6D:
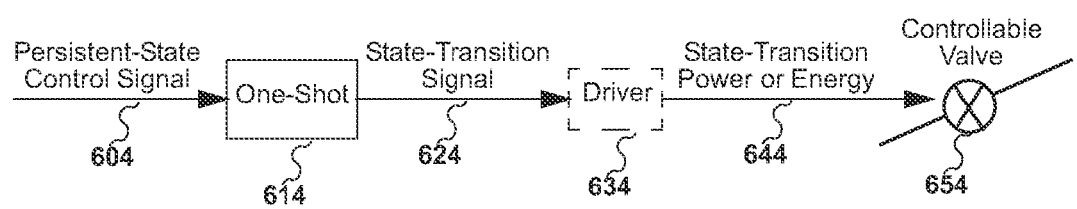
FIG. 6d depicts exemplary use of a one-shot function to convert an incoming persistent-state control signal into a state-transition signal to change the state of a controllable valve. In some embodiments the driver may be omitted.

Similarly, in other circumstances the control signal may be in the form of a persistent-state control signal but the valve to be controlled requires a state-transition control signal. In this case an additional conversion is required. FIG. 6d depicts an exemplary realization of this. Here an incoming persistent-state control signal 604 may be provided to a one-shot 614 function that creates a transient signal reflecting the change in the incoming persistent-state control signal 604. The flip-flop 614 function subsequently can naturally provide a persistent-state signal 624 that may be applied provided to a driver 634 which may convert and/or isolate the control signal into power or energy 644 used to maintain the state of a controllable valve 654. In some embodiments, the state-transition signal 624 itself may be such that it can directly provide power or energy 644 to directly maintain the state of a controllable valve 654; in this case the driver 634 may be omitted.

Control Signal Architecture

The control signals 601-604 described in conjunction with FIGS. 6a-6d may come from a variety of sources. Four of many possible examples are depicted in the exemplary arrangements of FIGS. 7a-7d. FIG. 7a depicts a first arrangement for providing control signals to a collection of k controllable valves 751.1-751.*k*. As may or may not be needed or advantageous in various implementations, one or more of the signals applied to controllable valves 750.1-750.*k* may be provided by converters 710.1-710.*k* and/or drivers 730.1-730.*k* to process incoming control signals 700.1-700.*k* in manners such as those described above in conjunction with FIGS. 6a-6d. In the example of FIG. 7a, the control signals 700.1-700.*k* are provided directly by a controlling processor 761. The controlling processor 761 may be part of the larger associated system comprising the Multi-channel Chemical Transport Bus, or the controlling processor 761 may be external to the larger associated system, or controlling processor 761 may itself be considered and/or implemented as part of the Multi-channel Chemical Transport Bus.

FIG. 7b depicts a second exemplary arrangement for providing control signals to a collection of k controllable valves. As described above in relation to FIG. 7a, one or more of the signals applied to controllable valves may be provided by converters and/or drivers to process incoming control signals 700.1-700.*k* in manners such as those described above in conjunction with FIGS. 6a-6d. In the example depicted in FIG. 7b, the control signals are provided by a demultiplexer 762 that demultiplexes an incoming control signal 772. The demultiplexer 762 may be part of the larger associated system comprising the Multi-channel Chemical Transport Bus, or the demultiplexer 762 may be external to the larger associated system, or demultiplexer 762 may itself be considered and/or implemented as part of the Multi-channel Chemical Transport Bus. This exemplary arrangement may be advantageous when the control signals provided by demultiplexer 762 are state-transition signals.

FIG. 7c depicts a third exemplary arrangement for providing control signals to a collection of k controllable valves. As described above in relation to FIG. 7a, one or more of the signals applied to controllable valves may be provided by converters and/or drivers to process incoming control signals 700.1-700.*k* in manners such as those described above in conjunction with FIGS. 6a-6d. In the example depicted in FIG. 7c, the control signals are provided by an addressable latch 763 responsive to an incoming control signal 773. The addressable latch 763 may be part of the larger associated system comprising the Multi-channel Chemical Transport Bus, or the addressable latch 763 may be external to the larger associated system, or addressable latch 763 may itself be considered and/or implemented as part of the Multi-channel Chemical Transport Bus. This exemplary arrangement may be advantageous when the control signals provided by addressable latch 763 are persistent-state signals.

FIG. 7d depicts a fourth exemplary arrangement for providing control signals to a collection of k controllable valves. As described above in relation to FIG. 7a, one or more of the signals applied to controllable valves may be provided by converters and/or drivers to process incoming control signals 700.1-700.*k* in a manner such as that described above in conjunction with FIGS. 6a-6d. In the example depicted in FIG. 7d, the control signals are provided by local controlling processor 764 responsive to an incoming control signal and/or other communications 774. The local controlling processor 764 may be part of the larger associated system comprising the Multi-channel Chemical Transport Bus, or the local controlling processor 764 may be external to the larger associated system, or local controlling processor 764 may itself be considered and/or implemented as part of the Multi-channel Chemical Transport Bus.

Figure 7E:
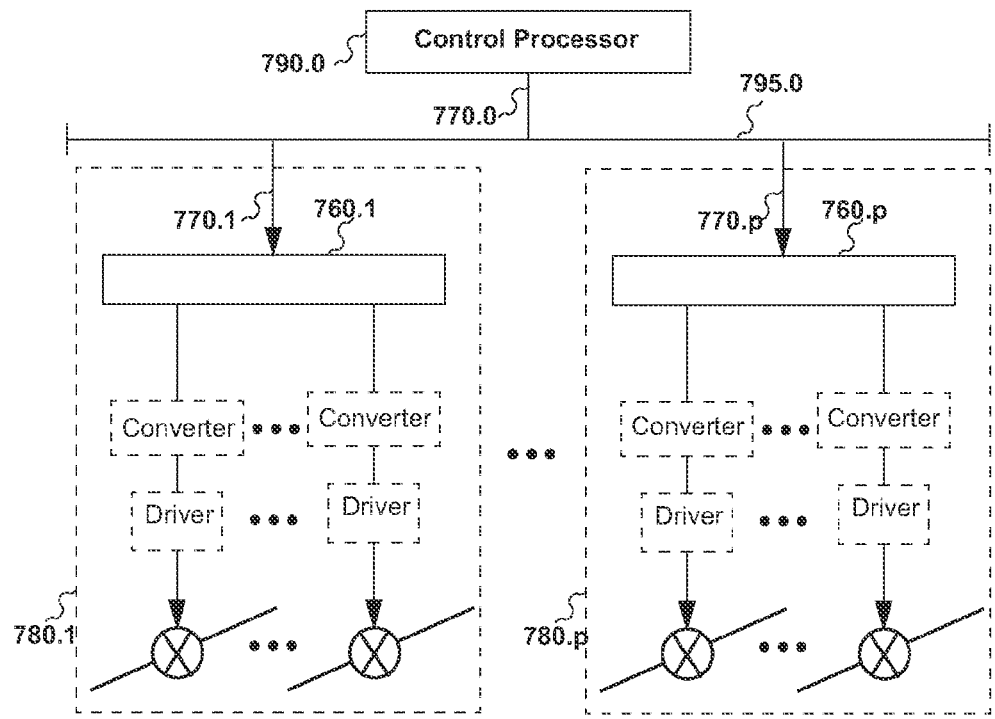
FIG. 7e shows an exemplary arrangement wherein two or more instances of the exemplary control signal arrangements of FIGS. 7b-7d may be incorporated into a larger-scale control signal architecture.

FIG. 7e shows an exemplary arrangement wherein two or more instances 780.1-780.*p* of the control signal arrangements of FIGS. 7b-7d may be incorporated into a larger-scale control signal architecture. Each of the two or more instances 780.1-780.*p* may be any of the exemplary control signal arrangements of FIGS. 7b-7d, so that the collection 780.1-780.*p* may be all of the same type or of mixed type. Each instance includes its own uniquely associated local control signal source 760.1-760.*p*, which may be demultiplexer, addressable latch, local processor, or other controllable signal source. Each local control signal source 760.1-760.*p* is respectively provided with a uniquely associated communications path 770.1-770.*p* that interfaces with a shared signal bus 795.0. In the arrangement of FIG. 7e, the shared signal bus 795.0 also connects with a control processor 790.0 via communications path 770.1. The control processor 790.0 can thus provide controlling communications to each of the local control signal sources 760.1-760.*p*. The shared signal bus 795.0 and associated interconnections may also facilitate additional related and unrelated communications among the controlling processor 790.0 and/or the local control signal sources 760.1-760.*p*.

Figure 7F:
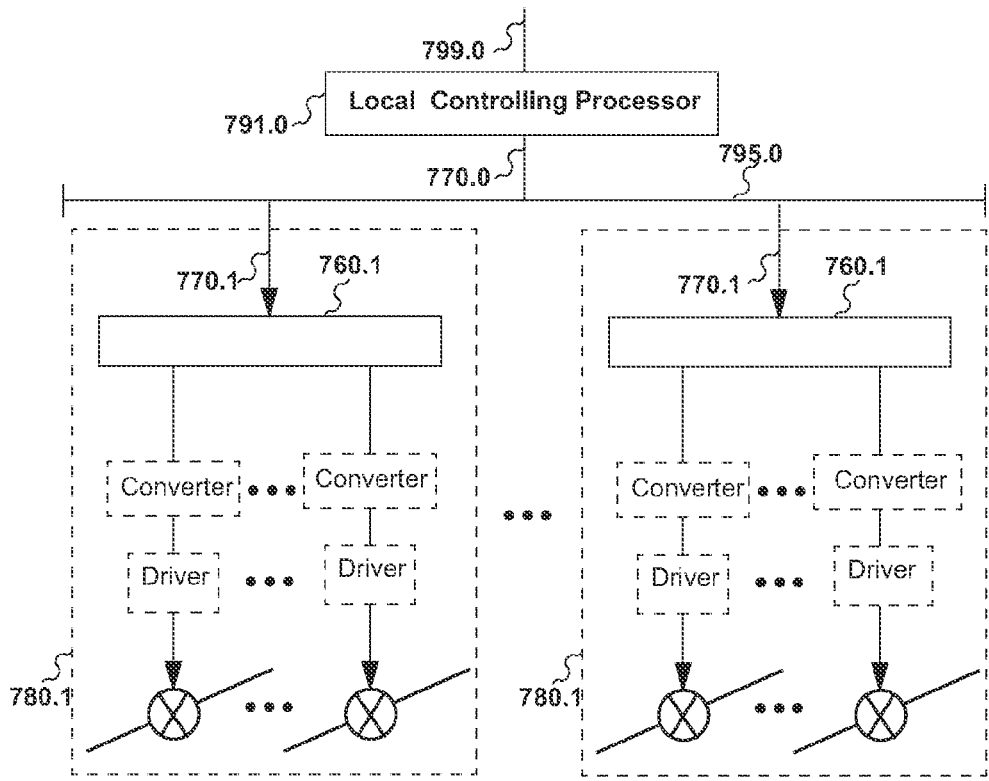
FIG. 7f shows an exemplary variation of the arrangement of FIG. 7e where the control processor is replaced by a local controlling processor provided with an external communications path that may connect with another peer, superior, or subordinate processor, directly or via another communications bus.

FIG. 7f shows an exemplary variation of the arrangement of FIG. 7e wherein the control processor 790.0 of FIG. 7e is replaced by a local controlling processor 791.0 that is also provided with an external communications path 799.0. The external communications path 799.0 may connect with another peer, superior, or subordinate processor, directly or via another communications bus.

Figure 7G:
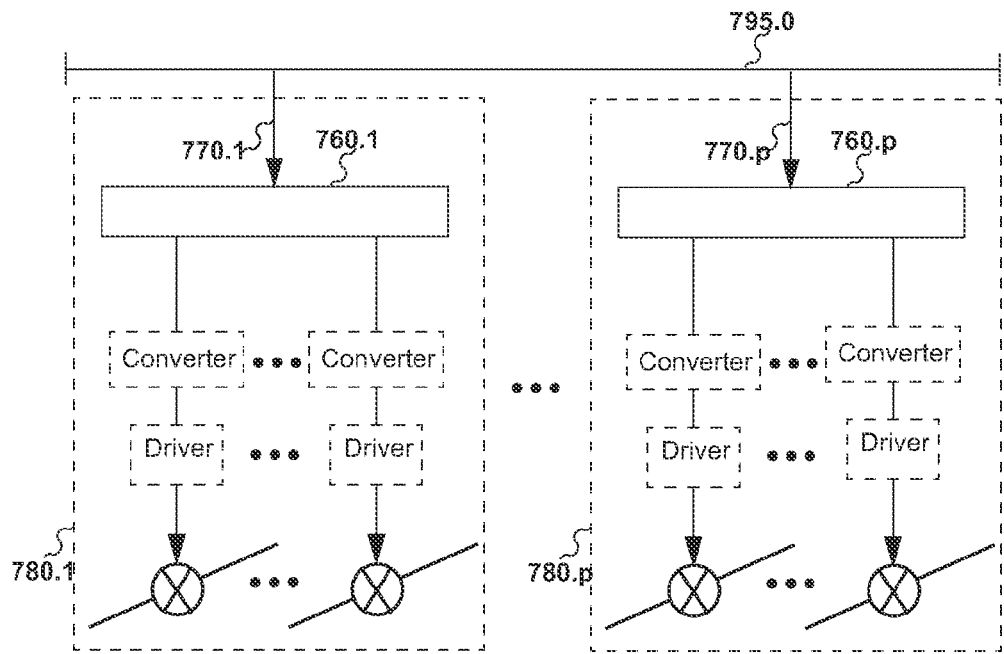
FIG. 7g shows an exemplary variation of the arrangement of FIG. 7e where the control processor is not provided and the local control signal sources (such as local controlling processors depicted FIG. 7d) may communicate amongst themselves.

FIG. 7g shows an exemplary variation of the arrangement of FIG. 7e wherein the control processor 790.0 of FIG. 7e is omitted. In such an arrangement, each of the local control signal sources 760.1-760.p may communicate amongst themselves. This arrangement is at least applicable to arrangements wherein the instances 780.1-780.p comprise local controlling processors (such as the case depicted in the example of FIG. 7d).

Figure 7H:
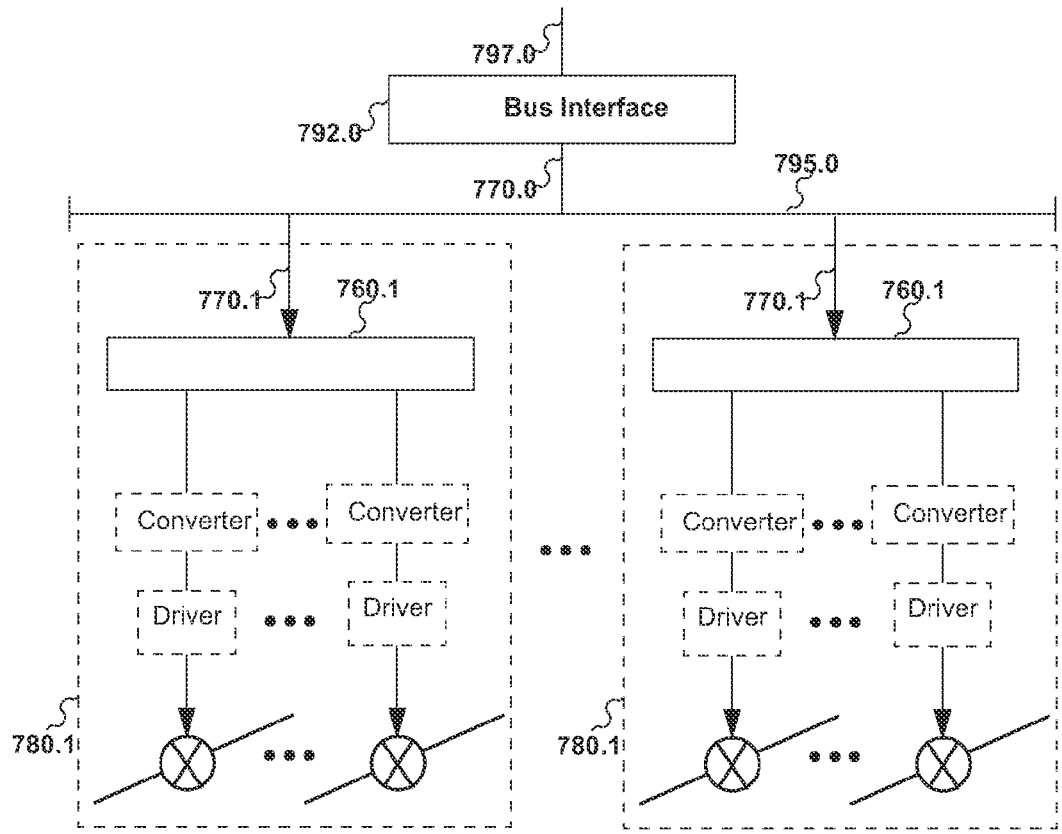
FIG. 7h shows an exemplary variation of the arrangements of FIG. 7f and FIG. 7g wherein the local controlling processor of FIG. 7e is replaced by a bus interface provided with an external communications path that may connect with another peer, superior, or subordinate processor, directly or via another communications bus.

FIG. 7h shows an exemplary variation of the arrangements of FIG. 7f and FIG. 7g wherein the local controlling processor 791.0 of FIG. 7e is replaced by a bus interface 792.0 that is also provided with an external communications path 797.0. The external communications path 797.0 may connect with another peer, superior, or subordinate processor, directly or via another communications bus.

Figure 7I:
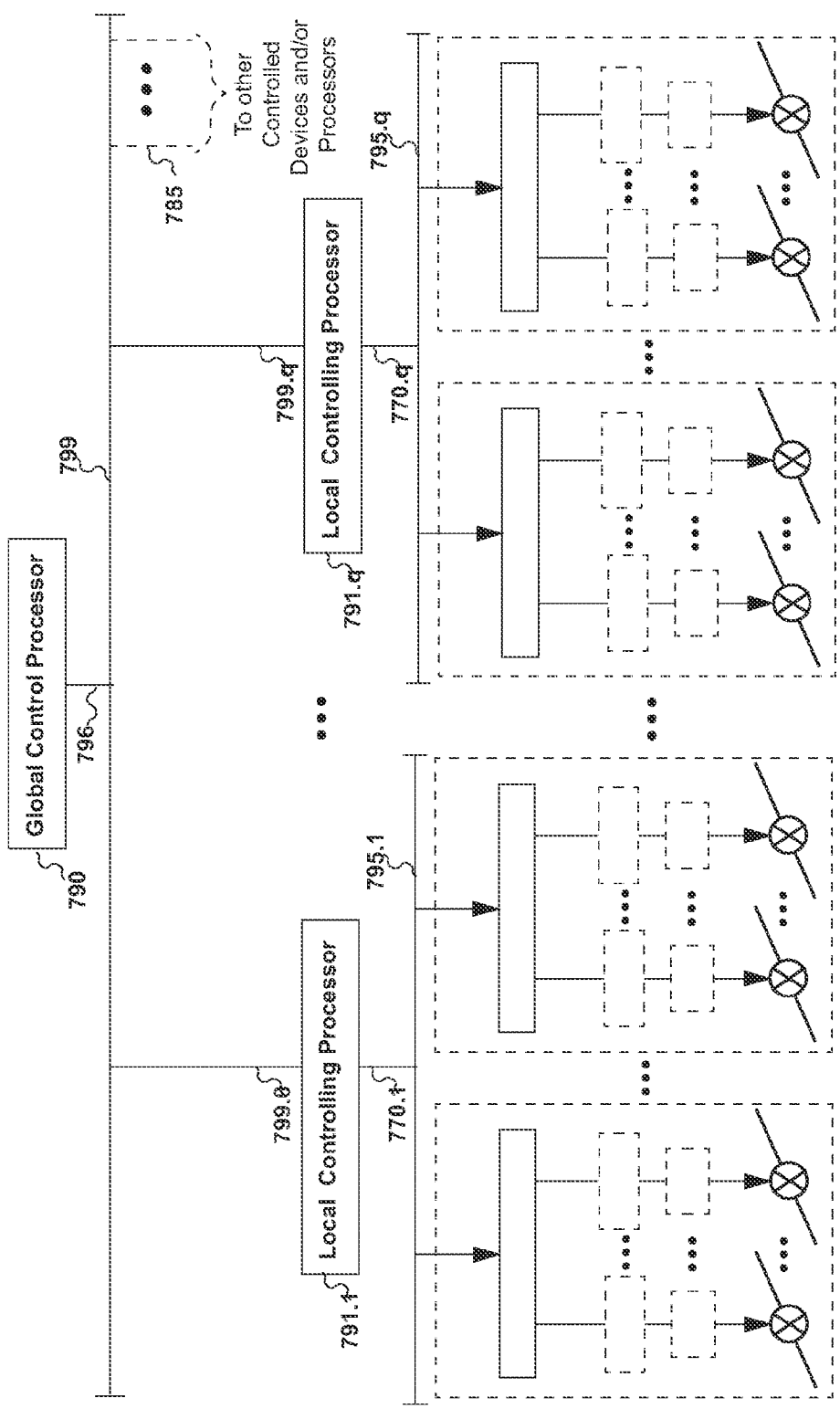
FIG. 7i shows an exemplary arrangement wherein two or more instances of the arrangement of FIG. 7f are connected with an additional shared signal bus that is also connected to a global control processor. In some embodiments the shared signal bus may also provide control signals to and/or exchange other communications with other controlled devices and/or processors.

FIG. 7i shows an exemplary arrangement wherein q instances (q at least 2) of the arrangement of FIG. 7f are in turn each connected via their respective communications paths 799.1-799.q with an additional shared signal bus 799. This additional shared signal bus 799 is also connected to a global control processor 790 via communications path 796. This global control processor 790 can thus provide controlling communications to each of the local controlling processors 790.1-790.p. The shared signal bus 799 and associated interconnections may also facilitate additional related and unrelated communications among the global control processor 790 and/or the local control signal sources 769.1-790.p. In some embodiments, the shared signal bus 799 may also provide control signals to and/or exchange other communications 785 with other controlled devices and/or processors.

Figure 7J:
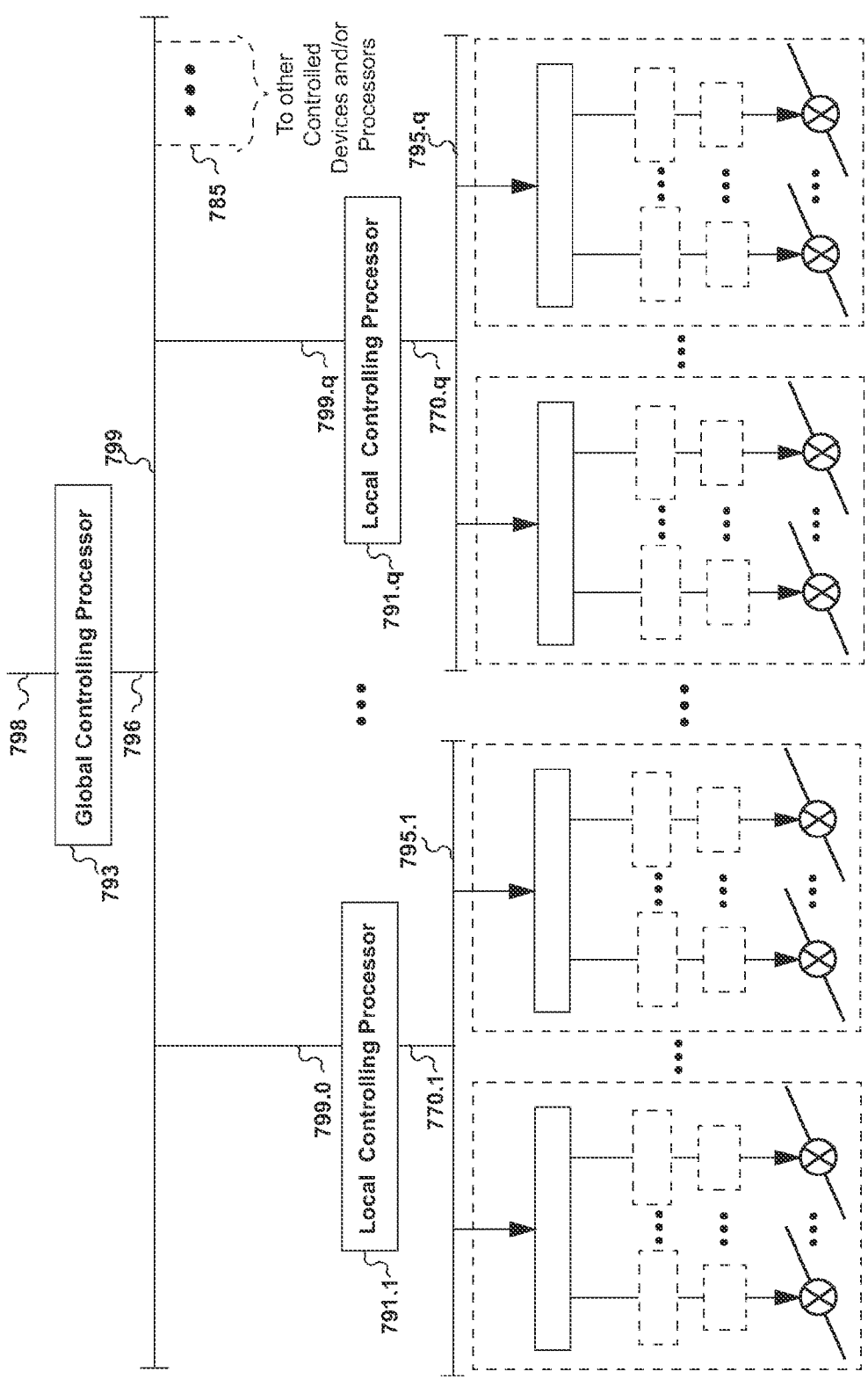
FIG. 7j shows an exemplary variation on the arrangement of FIG. 7i wherein the global control processor is replaced by a global controlling processor provided with an external communications path that may connect with another peer, superior, or subordinate processor, directly or via another communications bus.

FIG. 7j shows an exemplary variation on the arrangement of FIG. 7i wherein the global control processor 790 is replaced by a global controlling processor 793 that is also provided with an external communications path 798. The external communications path 798 may connect with another peer, superior, or subordinate processor, directly or via another communications bus.

Figure 7K:
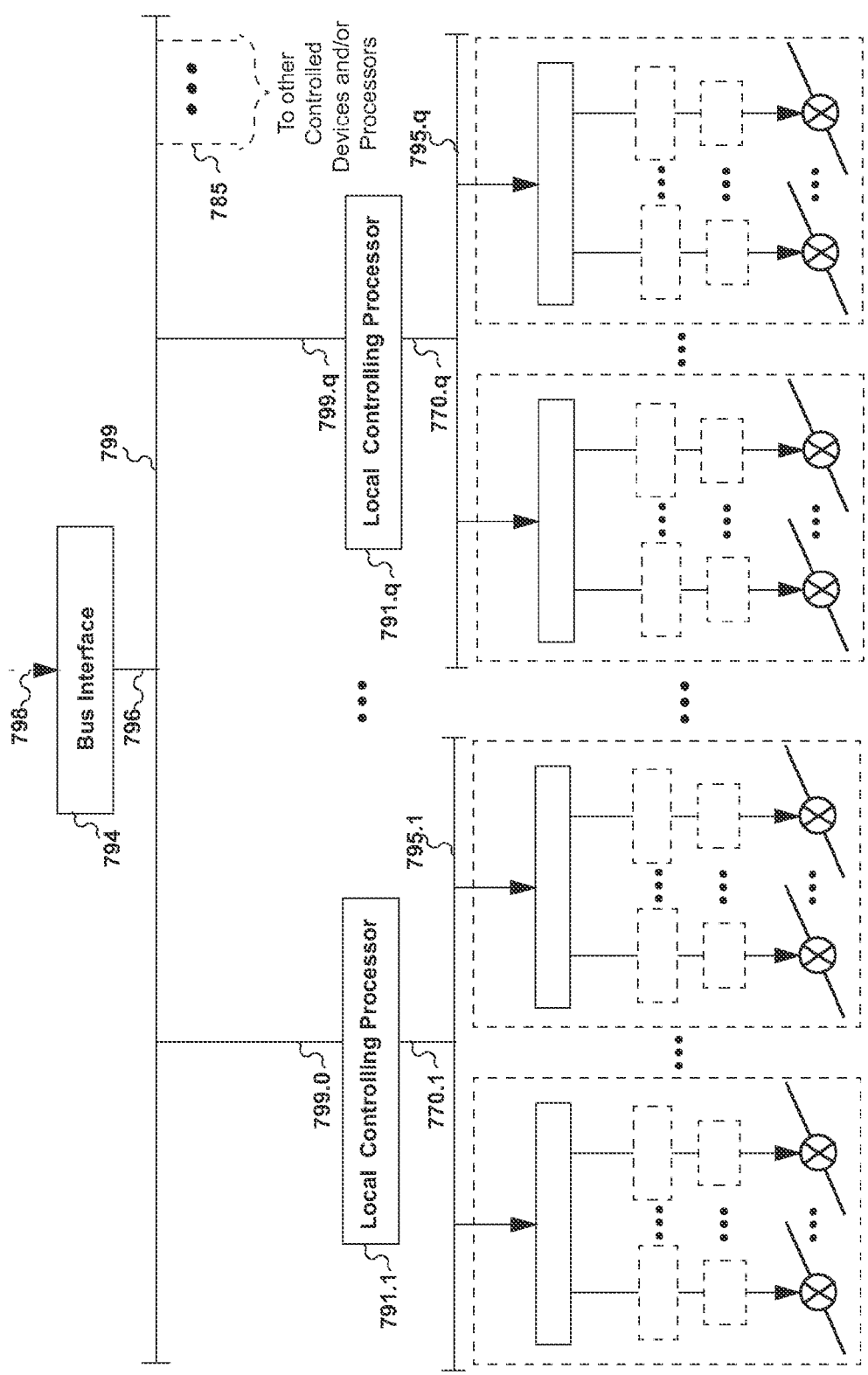
FIG. 7k shows an exemplary variation on the arrangement of FIG. 7j where the global controlling processor is replaced by a bus interface provided with an external communications path that may connect with another peer, superior, or subordinate processor, directly or via another communications bus.

FIG. 7k shows an exemplary variation of the arrangement of FIG. 7j wherein the global controlling processor 793 is replaced by a bus interface 794 that is also provided with an external communications path 798. The external communications path 798 may connect with another peer, superior, or subordinate processor, directly or via another communications bus.

Exemplary Embodiments and Capabilities of a Controllable Open-System Multi-channel Chemical Transport Bus The exemplary embodiment of a Multi-channel Chemical Transport Bus depicted in FIG. 4 has been shown to implement various software-controllable closed systems such as those depicted in FIGS. 2a, 2b, and 3a and various closed system configurations such as those depicted in FIGS. 5a-5c. The exemplary embodiment of a Multi-channel Chemical Transport Bus depicted in FIG. 4 can also be adapted to implement open systems such as those depicted in FIGS. 1, 2, 3b, and 3c.

Figure 8A:
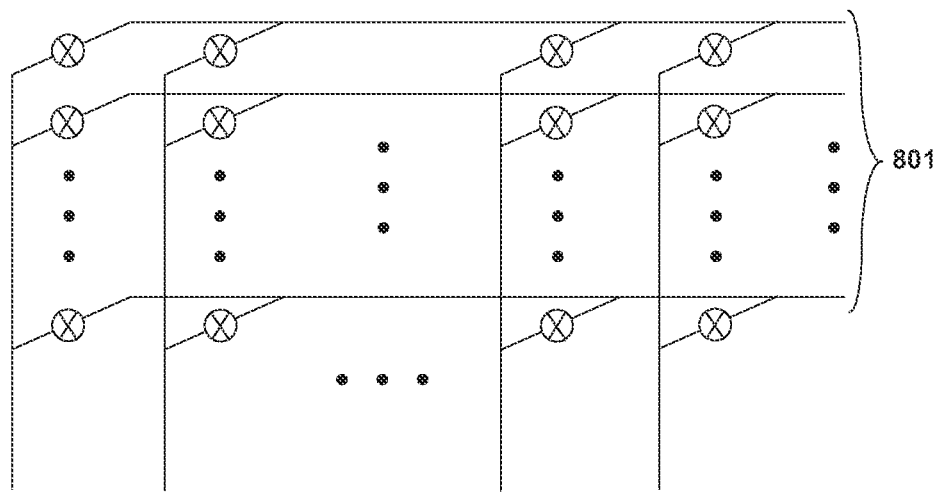
FIG. 8a shows an exemplary open system embodiment employing the same basic types of components and architectures as that of the closed system embodiment of FIG. 4 but adding additional external paths to the bus lines to provide inputs and outputs of chemical substances to and from the larger associated system. Additionally, ports that would otherwise connect with system-internal devices may be used as inputs and outputs.

FIG. 8a shows an exemplary open system embodiment employing the same basic types of components and architectures as that of the closed system embodiment of FIG. 4 but adding additional external paths 801 to the bus lines 410.1-410.n. This adaptation can implement open systems such as those depicted in FIGS. 1, 2, 3b, and 3c by simply servicing various flow directions. The external paths 801 can be used to provide inputs and outputs of chemical substances to and from the larger associated system. Note it is also possible to use ports that would otherwise connect with system-internal devices as inputs and outputs. In some cases this may be advantageous, but typically incurs a complexity penalty in that more valves may be required as compared to using the external paths 802. The inputs and outputs may be chemical substances associated with the fundamental purpose of the larger associated system with respect to an application, and may also provide means for clearing and cleaning at least the Multi-channel Chemical Transport Bus between at least some operations. Clearing and cleaning at least the Multi-channel Chemical Transport Bus is considered further in a subsequent section.

Figure 8B:
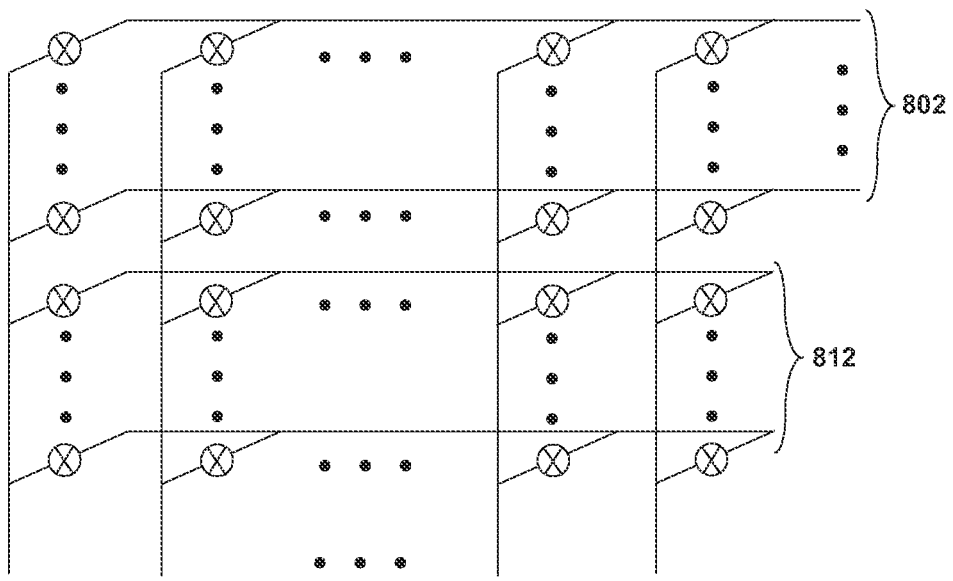
FIG. 8b shows a variation of FIG. 8a where only some of the bus lines are provided with external paths while others no such external paths.

FIG. 8b shows a variation of FIG. 8a where only some of the bus lines 410.1-410.n of FIG. 4 are provided with external paths 802 while other paths 812 of the bus lines 410.1-410.n of FIG. 4 have no such external paths. In such an arrangement, the external paths 802 can be used to provide inputs and outputs of chemical substances to and from the larger associated system and may also provide means for clearing and cleaning. The internal-only bus lines 812 may be used for interconnections of devices. Note it is also possible to use ports that would otherwise connect with system-internal devices as inputs and outputs. In some cases this may be advantageous, but typically incurs a complexity penalty in that more valves may be required as compared to using the external paths 802.

Transport and Pressure Equalization Issues in the Multi-channel Chemical Transport Bus In order for flows to occur there typically must be pressure differences or gradients within the larger associated system and/or any external connections outside the larger associated system. In some embodiments, implementations, and applications these pressure differences or gradients may provide the means for propelling transported substances and materials within the Multi-channel Chemical Transport Bus, and as such may be created or modulated by pumps, valves, chemical reactions, or other means. In other embodiments, implementations, and applications the propelling transported substances and materials within the Multi-channel Chemical Transport Bus may involve other transport processes, such as microchannel osmosis or electrokinetic flow. In these circumstances pressure differences or gradients within the larger associated system and/or any external connections are created as a result of transport processes.

In either case, various embodiments provide for pressure equalization and/or venting required in order for the flows of liquids and gasses to occur. In some embodiments, implementations, and applications pressure equalization and/or venting may be accomplished by additional ports and paths on the Multi-channel Chemical Transport Bus, or on a separate Multi-channel Chemical Transport Bus devoted to pressure equalization and/or venting functions, or a combination of these, as well as other means.

Figure 9A:
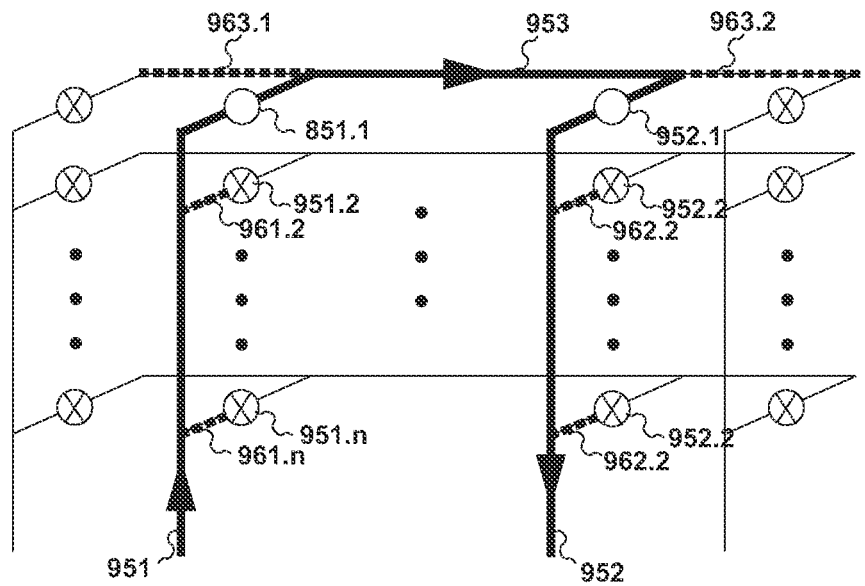
FIG. 9a depicts an exemplary situation involving incoming and outgoing flow invoking seepage, splattering osmosis, pressure gradients, and/or other leaking and leeching processes (as shown by the dashed lines) at either end of the routed flow and into the vestibules paths of other valves.

Localization and Contamination Issues in Multi-channel Chemical Transport Bus Design One operational concern in the chemical bus arrangements depicted in FIGS. 4, 8a and 8b is contamination and waste resulting from residues and remnants of previous flows. For example, consider the arrangement in FIG. 4 as may be used in implementing FIGS. 2a, 2b, and 3a. FIG. 9a depicts an exemplary situation involving incoming 951 and outgoing 952 flow routed 953 through open valves 951.1 and 952.1 through a connecting bus line of the Multi-channel Chemical Transport Bus embodiment depicted in FIG. 4. However, due to seepage, splattering osmosis, pressure gradients, and/or other processes, chemical substances will typically, at least to some degree, leak at either end of the routed flow 953 as shown by the dashed lines 963.1 and 963.2, as well as leaching into the vestibules of the paths 961.2-961.*n*, 962.2-962.*n* linking to other proximate valves 951.2-951.*n*, 952.2-952.*n*.

Figure 9B:
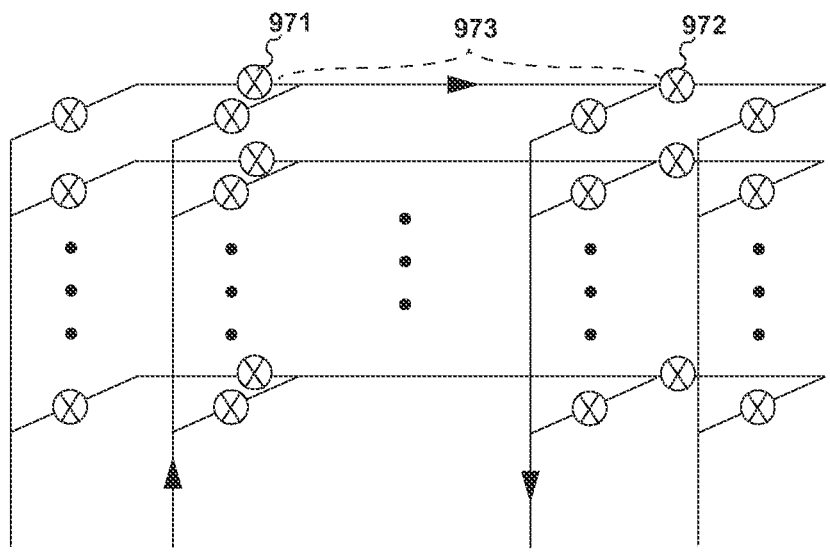
FIG. 9b illustrates how the introduction of additional on/off "localization" valves to localize leakage and leeching illustrated in FIG. 9a to a smaller span.
Figure 9C:
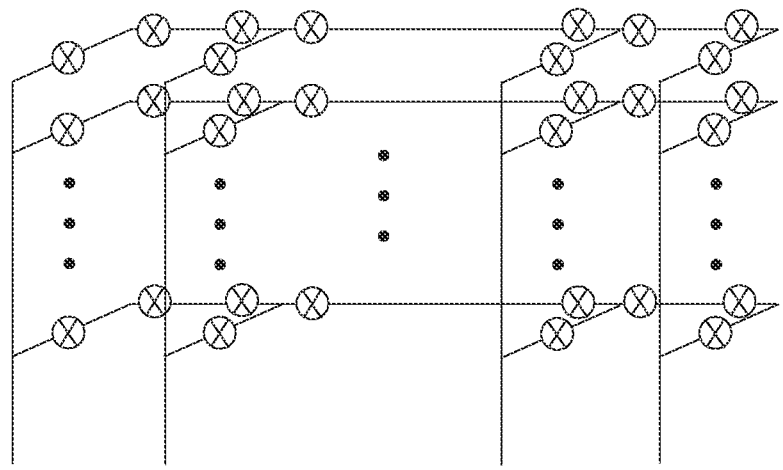
FIG. 9c shows a systematic repetitive placement of the numerous on/off valves throughout the bus lines to localize leaking and leeching reveals functionally redundant valves at either end of each bus line.

The matter of leaching into the vestibules of the paths linking to other proximate valves will be considered later. Here, FIG. 9*b* illustrates the introduction of additional on/off valves 871, 872 to localize leakage and leeching 863.1, 863.2 illustrated in FIG. 9*a* to a smaller span 873. Of course these two additional on/off valves 871, 872 are essentially only an effective localizing value for the situation depicted in FIG. 9*a*. However, the approach illustrated in FIG. 9*b* can be generalized throughout a Multi-channel Chemical Transport Bus by introducing on/off valves as proximate as possible on either side of each "T" junction of the bus lines as shown in FIG. 9*c*. These will be referred to herein as localization valves. In some implementations and embodiments, such as a LoC device, the resultant large number of localization valves each may be "relatively cheap" in that they are readily rendered via sequences of photolithography or other mass-automated process. In other systems, the resultant large number of relatively more expensive valves may still be cost justified by other economic considerations of the resulting system.

Figure 9D:
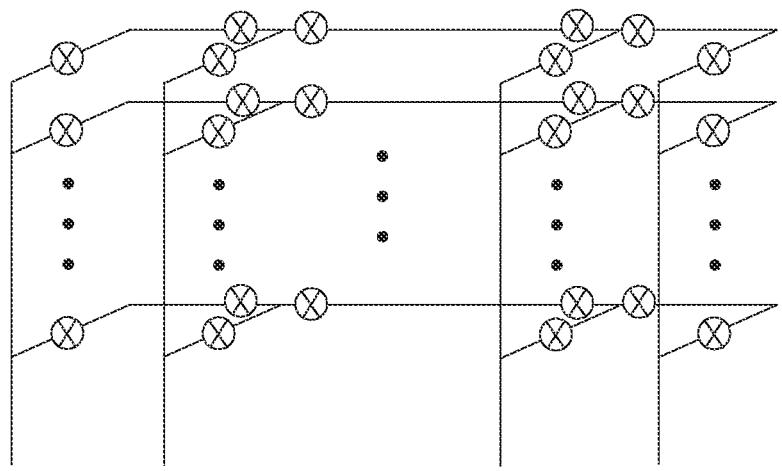
FIG. 9d shows a simplification of the arrangement of FIG. 9c where functionally redundant valves at either end of each bus line have been removed.

Closer inspection of FIG. 9*c* shows that systematic repetitive placement of the numerous localization valves throughout the bus lines to localize leaking and leeching reveals functionally redundant valves at either end of each bus line. FIG. 9*d* shows a simplification of the arrangement of FIG. 9*c* where functionally redundant valves at either end of each bus line have been omitted.

FIGS. 10*a*-10*d* show exemplary usage of the arrangement of FIG. 9*d* to provide a sequence of different flow paths. As is clear to one skilled in the art, the arrangement of FIG. 9*d* can also support multiple simultaneous flows. However, the sequence depicted in FIGS. 10*a*-10*d* also are sufficient to illustrate that a number of the valves can potentially be reused in the transport of typically different chemical substances. This raises the issue of single-purpose use and the issue of clearing and cleaning of the Multi-channel Chemical Transport Bus between at least some operations.

Figure 10A:
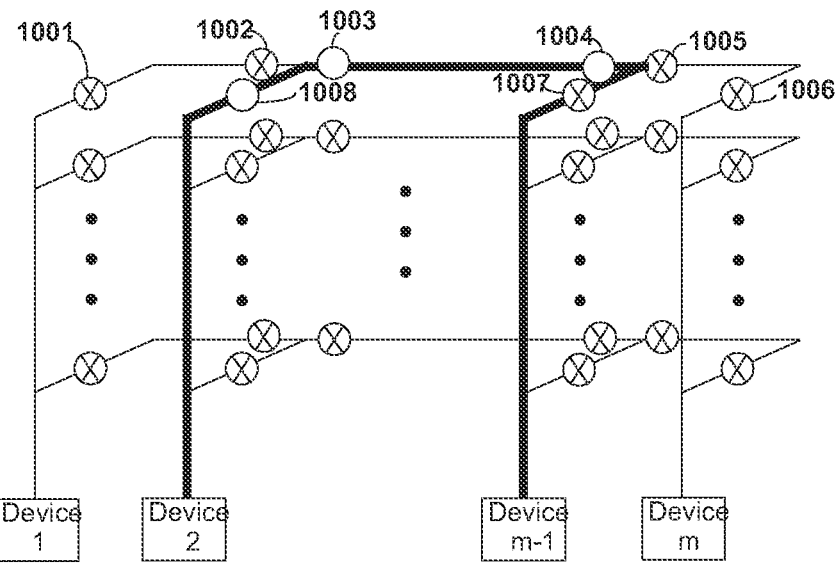
FIGS. 10a-10d show exemplary usage of the arrangement of FIG. 9d to provide a sequence of different flow paths, and also illustrate that a given valve can potentially being reused in the transport of typically different chemical substances, raising issue of single-purpose use, clearing and cleaning.
Figure 10B:
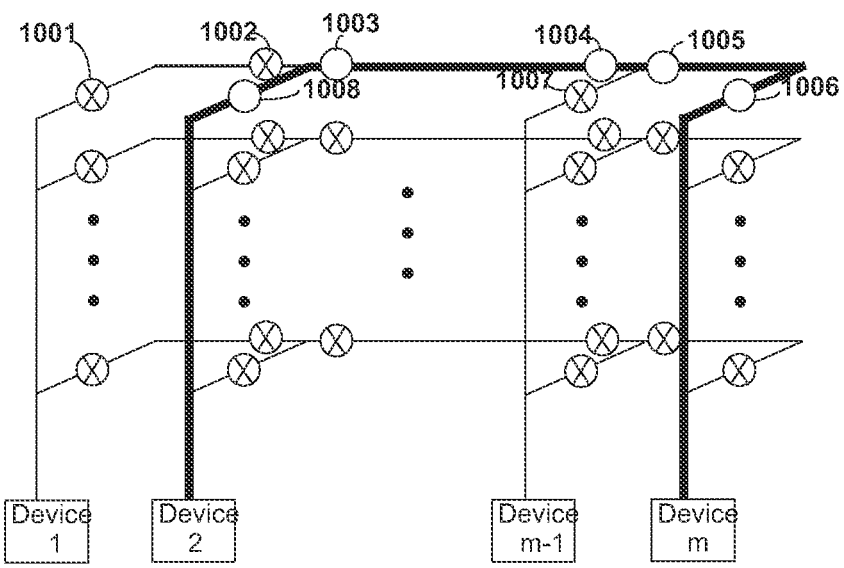
Figure 10C:
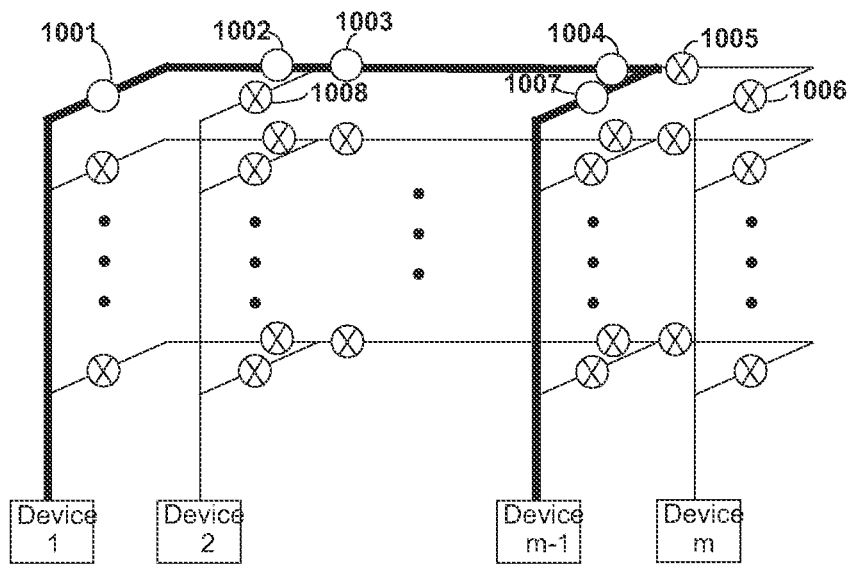
Figure 10D:
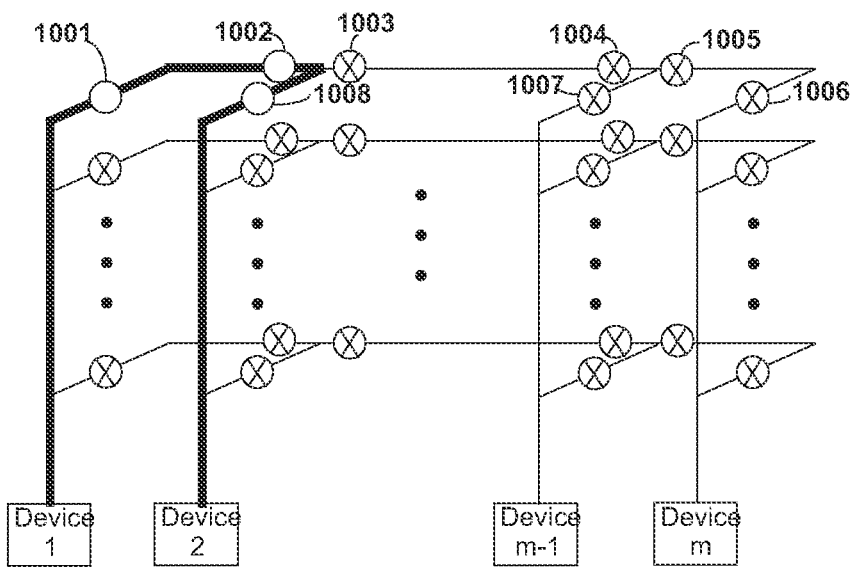

In particular, FIG. 10*a* shows a first exemplary flow between Device 2 and Device 3 employing open valves 1008, 1003, 1004, 1005, and 1007. Next, FIG. 10*b* shows a second exemplary flow between Device 2 and Device 4 employing open valves 1008, 1003, 1004, 1005 and 1006. Then, FIG. 10*c* shows a third exemplary flow between Device 1 and Device 3 employing open valves 1001, 1002, 1003, 1004, 1005, and 1007. Finally, FIG. 10*d* shows a fourth exemplary flow between Device 1 and Device 2 employing open valves 1001, 1002 and 1008.

As can be seen from the exemplary sequence depicted in FIGS. 10*a*-10*d*, each of valves 1001, 1002, 1003, 1004, 1005, 1007, and 1008 are used at least twice, however potentially different chemical substances may be exchanged among devices. Thus, typically it is advantageous to provide provisions to avoid or limit contamination among the potentially different chemical substances.

In some embodiments and applications, portions of a Multi-channel Chemical Transport Bus may be designated for single substance-type use, single-purpose use, or even single-event use. Such embodiments and applications typically lead to increasing the bus line count n (for example in FIG. 4) with resulting impacts on complexity. In some applications or embodiments, software or firmware control of the Multi-channel Chemical Transport Bus may include a predefined resource allocation strategy to enforce single substance-type use, single-purpose use, or even single-event use of Multi-channel Chemical Transport Bus elements. In other embodiments, software or firmware control of the Multi-channel Chemical Transport Bus may include a dynamically responsive usage-event tagging system providing input to a bus dynamic resource allocation system to enforce single substance-type use, single-purpose use, or even single-event use of Multi-channel Chemical Transport Bus elements. In yet other embodiments, combinations of predefined resource allocation strategy and dynamic resource allocation system techniques may be used.

In other embodiments and applications, at least portions of a Multi-channel Chemical Transport Bus embodiment may provide for some form of clearing and cleaning of at least some portions the Multi-channel Chemical Transport Bus between at least some operations to allow buses, valves, and in many cases connected devices to be reused with limited contamination.

In yet other embodiments and applications, combinations of clearing and cleaning together with single substance-type use, single-purpose use, or even single-event use of at least some portions the Multi-channel Chemical Transport Bus may be employed. Various embodiments also provide for other methods of facilitating reuse of buses, valves, and in many cases connected devices to be reused with limited contamination as may be made possible from advances in technology and/or alternate or improved systems and methods.

With these considerations established, attention is now directed to exemplary methods and systems for clearing and cleaning. In addition to facilitating reuse of at least some Multi-channel Chemical Transport Bus components and/or attached devices in a larger associated system, clearing and cleaning may also be used to remove potentially dangerous, toxic, or contaminating substances prior to the recycling, disposal, or destruction of a Multi-channel Chemical Transport Bus or larger associated system at end-of-life.

Clearing and Cleaning Architectures

Clearing and cleaning of Multi-channel Chemical Transport Bus components and potentially of attached devices typically involves the following steps:

1. Evacuating bulk remnant substances left within elements after a desired flow is completed;
2. Purging residual traces of substances left within elements remaining after evacuating bulk remnants;
3. Any additional steps as may be needed to remove bulk remnant and residual traces of materials used in the above steps.

A few examples are considered below.

As a first example, if the completed desired flow was of a substance sufficiently volatile in air or other gases, the above may be realized by simply applying a flow of the appropriately chosen air of gas. At first a gas flow will push through the bulk remnant substances left within elements, initially as a flow and then as a sputter. Here, the role and value of the aforementioned localization valves is quite apparent. In this mode the flowing gas acts as a clearing gas. Then the flow of the same or different gas is used to facilitate the evaporation of residual traces of substances left within elements. In this mode the flowing gas acts as a cleaning gas. Should the cleaning gas be such that it be undesirable to leave within the flow path prior to the next use of the Multi-channel Chemical Transport Bus components and/or attached devices, the flow path may be cleared of cleaning gas by flow-based replacement by an ambience gas or by a vacuum operation. In some situations, the cleaning gas may comprise a fixed mixture, variable mixture, or sequence of different gasses.

As a second example, a clearing gas is used to push through the bulk remnant substances left within elements. Then one or more volatile liquid solvents flow through the path in order to dissolve residual traces of substances left within elements. In this mode the flowing liquid solvent(s) act(s) as a cleaning solvent, or more generally a cleaning liquid. Next a clearing gas flow will push through the bulk remnant substances left within elements, initially as a flow and then as a sputter. Then flow of one or more cleaning gasses is used to facilitate the evaporation of residual traces of substances left within elements. Should the cleaning gas be such that it be undesirable to leave within the flow path prior to the next use of the Multi-channel Chemical Transport Bus components and/or attached devices, the flow path may be cleared of cleaning gas by flow-based replacement by an ambience gas or by a vacuum operation. In some situations, the cleaning gas may comprise a fixed mixture, variable mixture, or sequence of different gasses.

As a third example, one or more liquids may be used to first push through the bulk remnant substances left within elements and then dissolve residual traces of substances left within elements. In this mode the flowing liquid acts as a clearing liquid. Next one or more volatile liquid cleaning solvents flow through the path in order to dissolve residual traces of substances left within elements. Then a clearing gas flow will push through the bulk remnant substances left within elements, initially as a flow and then as a sputter. Then flow of one or more cleaning gasses is used to facilitate the evaporation of residual traces of substances left within elements. Should the cleaning gas be such that it is undesirable to leave within the flow path prior to the next use of the Multi-channel Chemical Transport Bus components and/or attached devices, the flow path may be cleared of cleaning gas by flow-based replacement by an ambience gas or by a vacuum operation. In some situations, the cleaning gas may include a fixed mixture, variable mixture, or sequence of different gasses.

As a fourth example, one or more liquid solvents may be used to first push through the bulk remnant substances left within elements and then dissolve residual traces of substances left within elements. In this mode the flowing liquid solvent(s) act(s) as both a clearing liquid and a cleaning solvent. Then a clearing gas flow will push through the bulk remnant substances left within elements, initially as a flow and then as a sputter. Then flow of one or more cleaning gasses is used to facilitate the evaporation of residual traces of substances left within elements. Should the cleaning gas be such that it be undesirable to leave within the flow path prior to the next use of the Multi-channel Chemical Transport Bus components and/or attached devices, the flow path may be cleared of cleaning gas by flow-based replacement by an ambience gas or by a vacuum operation. In some situations, the cleaning gas may include a fixed mixture, variable mixture, or sequence of different gasses.

Evacuated remnant substances, clearing, and/or cleaning materials may be collected for recycle, recovery, and/or disposal. The collecting may occur within the larger associated system, outside the larger associated system, or in selective or sequenced combination. In various embodiments, any recycle, recovery, and/or disposal may occur within the larger associated system, outside the larger associated system, our in selective or sequenced combination.

Numerous variations of these clearing and cleaning substances and techniques are clear to one skilled in the art, and are provided for by assorted embodiments of the present invention. For example, in some applications ambient liquids may be used in place of ambient gas or vacuum. In some embodiments, aerosols may be used in place of clearing and/or cleaning liquids or gases. Additionally, other types of substances and applications may involve other types of clearing and cleaning techniques as is clear to one skilled in the art.

The clearing and cleaning techniques described herein can be implemented in a wide variety of ways using existing ports and paths with embodiments of the Multi-channel Chemical Transport Bus components and/or attached devices as described herein. In this approach, typically some internal or external sources provide cleaning and clearing materials (liquids, gases, aerosols, etc.) and some internal or external sinks are used to provide exit means for evacuated substances and cleaning materials.

Additionally, special provisions can be included for implementing clearing and cleaning features and operations. Two simple examples are described below, and further examples will be described in the context of other Multi-channel Chemical Transport Bus embodiments and implementations in subsequent material.

Figure 11A:
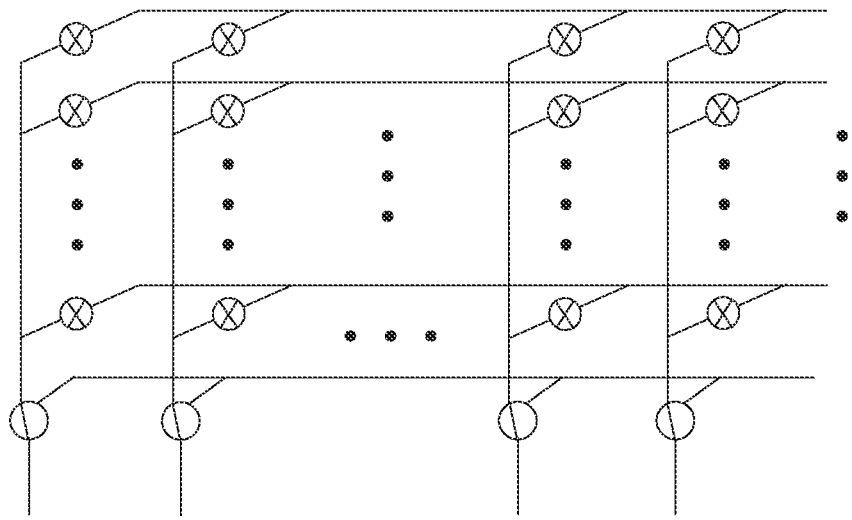
FIG. 11a depicts with an extra dedicated bus line linked to each device port with an individually associated single-pole double-throw ("3-way") valve for injecting clearing or cleaning material(s) into an attached device.
Figure 11B:
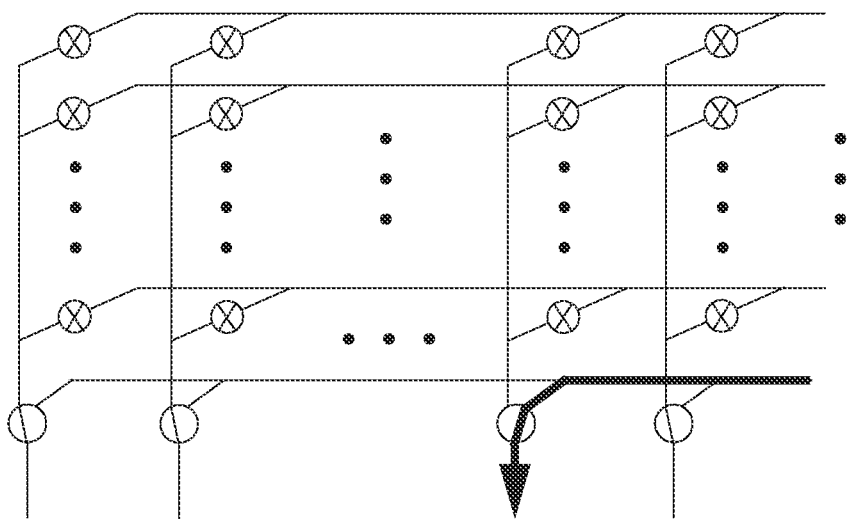
FIG. 11b shows exemplary flow through this dedicated bus line.

As a first example of a special provision for clearing and cleaning, FIG. 11a depicts an extra dedicated bus line linked to each device port with an individually associated "SPDT" ("single-pole double-throw", also known as "3-way") valve for injecting clearing or cleaning material(s) into an attached device. FIG. 11b shows exemplary flow (signified by the bolded arrowed path) of a clearing or cleaning material through this dedicated bus line, traveling through the SPDT valve, and directed to the attached device.

Figure 12A:
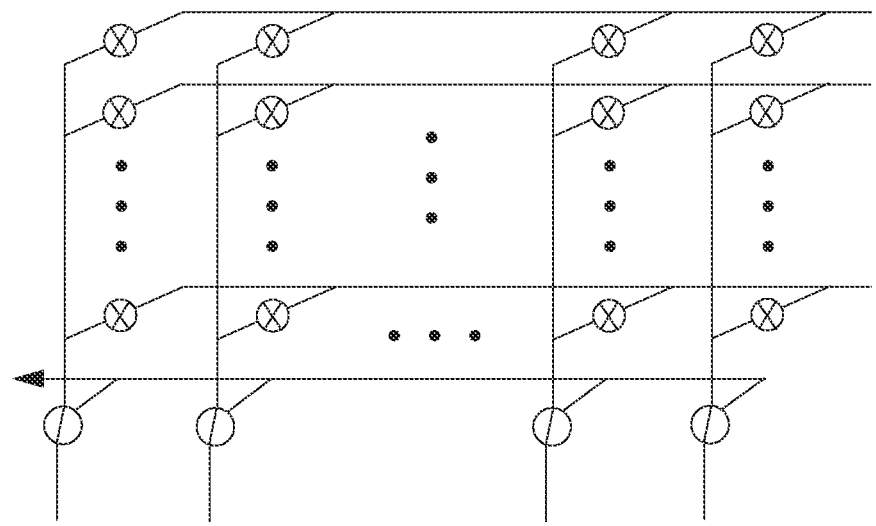
FIG. 12a depicts a similar extra dedicated bus line linked to each device port with an individually associated single-pole double-throw valve for evacuating remnant substances, clearing, and/or cleaning material(s) from an attached device.
Figure 12B:
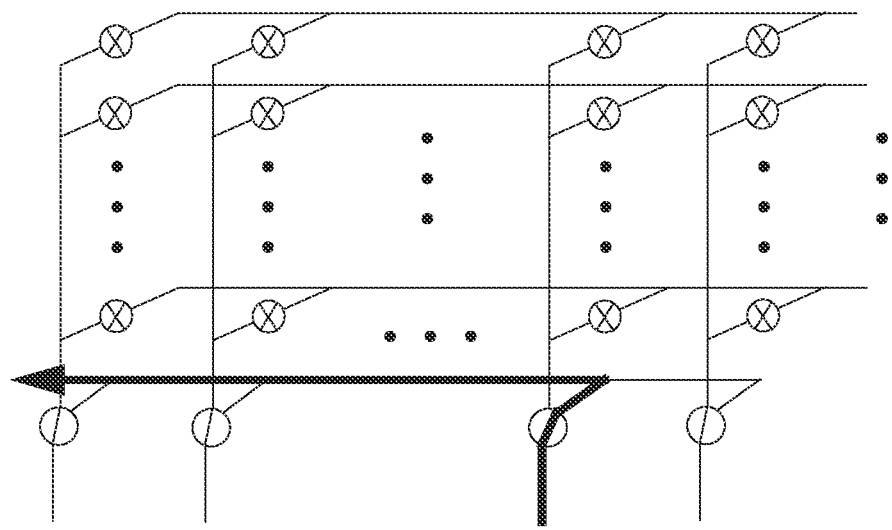
FIG. 12b shows exemplary flow through this dedicated bus line.

As a second example of a special provision for clearing and cleaning, FIG. 12a depicts a similar extra dedicated bus line linked to each device port with an individually associated SPDT valve for evacuating remnant substances, clearing, and/or cleaning material(s) from an attached device. FIG. 12b shows exemplary flow (signified by the bolded arrowed path) of an evacuating substance and/or material through this dedicated bus line, traveling through the SPDT valve, and directed to the attached device.

Incorporation of Flow and Other Sensors

Figure 13A:
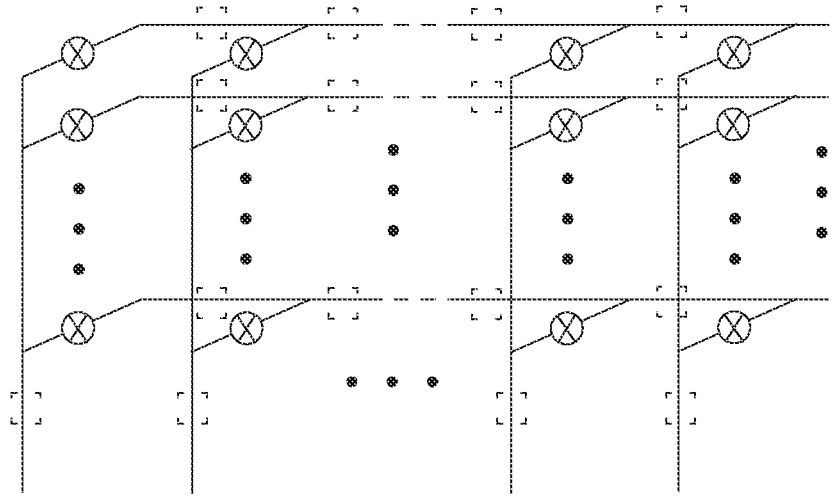
FIG. 13a illustrates some exemplary placements of sensors, represented by dashed squares, at various locations along the bus line segments between consecutive taps and port paths.
Figure 13B:
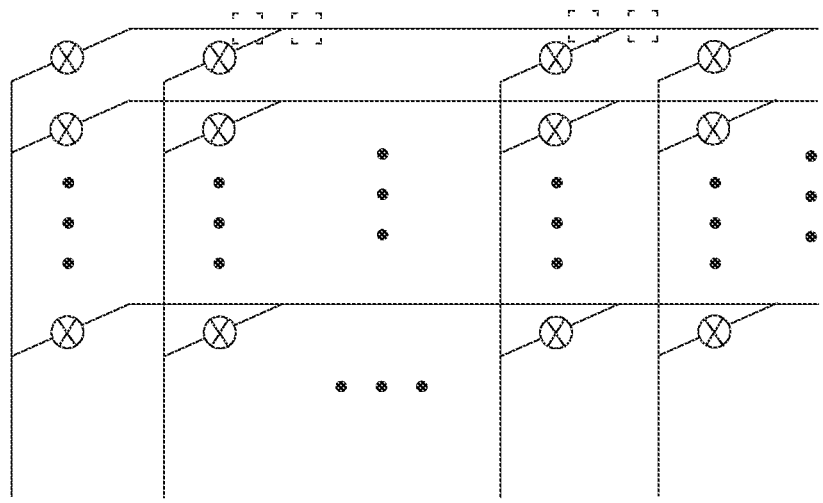
FIG. 13b depicts other sensor placements on either proximate side of a on a bus line tap.

In some embodiments, it may be advantageous to introduce or incorporate one or more sensors at various places within a Multi-channel Chemical Transport Bus, for example between each adjacent bus line tap. These sensors may be of one or more types, for example presence-sensors, flow-sensors, pressure-sensors, temperature-sensors, conductivity-sensors, turbidity-sensors, optical-sensors (i.e., transmission, absorption, polarization-rotation, etc.), ion-sensors, affinity-sensors, etc. as may be useful, desired, or advantageous in the operation of a Multi-channel Chemical Transport Bus and/or larger associated system. FIG. 13a illustrates some exemplary placements of sensors, represented by dashed squares, at various locations along the bus line segments between consecutive taps and on port paths within a Multi-channel Chemical Transport Bus. FIG. 13b depicts other sensor placements on either proximate side of a bus line tap. These sensors may, for example, serve to detect the presence and/or flow-rate of substances or materials in the depicted locations as may be advantageous or necessary for precise control of measured flows or for higher performance in clearing and/or cleaning operations.

Short-Duration Transport

Although attention will be directed to alternate embodiments and implementations of a Multi-channel Chemical Transport Bus, the example of FIG. 4 will continue to be used to illustrate one more group of additional concepts, namely short-duration transport. For simplicity many other issues raised and techniques introduced will initially be set aside.

However, one skilled in the art will appreciate how the issues described regarding short-duration transport naturally carry over to other embodiments and implementations of a Multi-channel Chemical Transport Bus.

Figure 14:
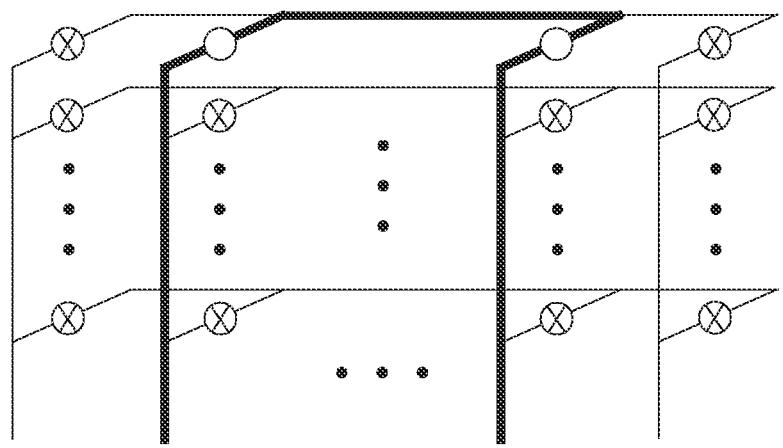
FIG. 14 depicts an idealized continuous flow between two devices.

FIG. 14 depicts an generalized continuous flow between two devices. Again for simplicity, issues and solutions involving leakage, leeching, localization, clearing, cleaning, etc. are set aside. Such a continuous flow is relevant for most rapid or simply-operated transport of chemical substances through a Multi-channel Chemical Transport Bus. However, in many cases it may be desirable or advantageous to transport chemical substances or clearing and cleaning materials in considerably smaller quantities that would be involved in the continuous flow depicted in FIG. 14. In this section, the transport of isolated or repeated short bursts of liquid substances or materials is considered.

Figure 15A:
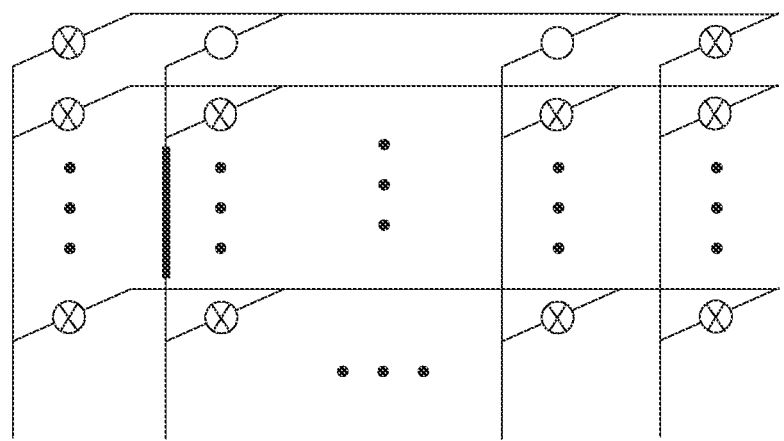
FIG. 15a shows a short-duration flow segment, or burst, of an exemplary liquid substance or material in the process of being transported from a source device.
Figure 15B:
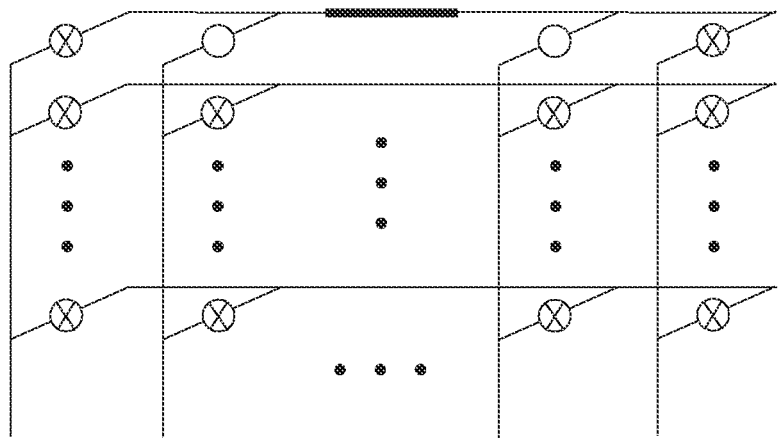
FIG. 15b shows the exemplary liquid substance or material presented now traveling through a bus segment.

As an opening example, FIG. 15a shows a short-duration flow segment, or burst, of a substance or material. In this figure, the burst is in the process of being transported from a source device deeper into the Multi-channel Chemical Transport Bus. On either side of the short-duration flow segment (i.e., burst) of the liquid substance or material is assumed to be ambient gas, a vacuum condition, a propelling gas, or in some circumstances a gas that may be used together with the liquid substance or material. Typically, however, any gases between each burst do not affect the substance or material being transported. FIG. 15b shows the exemplary liquid substance or material presented in FIG. 15a traveling through a bus segment of the Multi-channel Chemical Transport Bus, while FIG. 15c shows the exemplary liquid substance or material in the last stages of transport to a sink device.

Figure 15C:
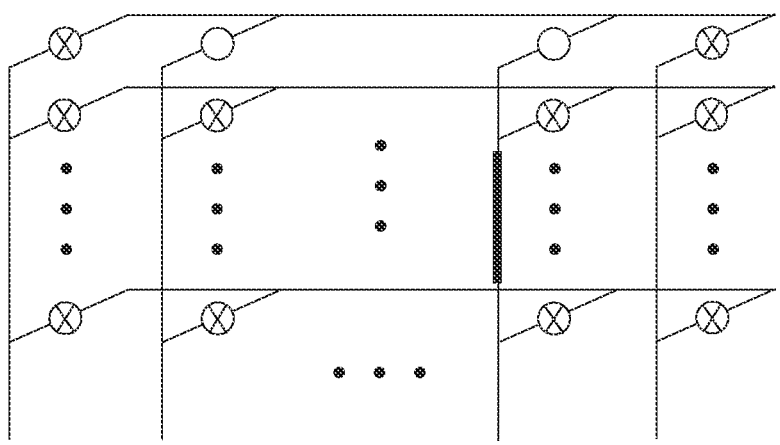
FIG. 15c shows the exemplary liquid substance or material now in the last stages of transport to a sink device.
Figure 15D:
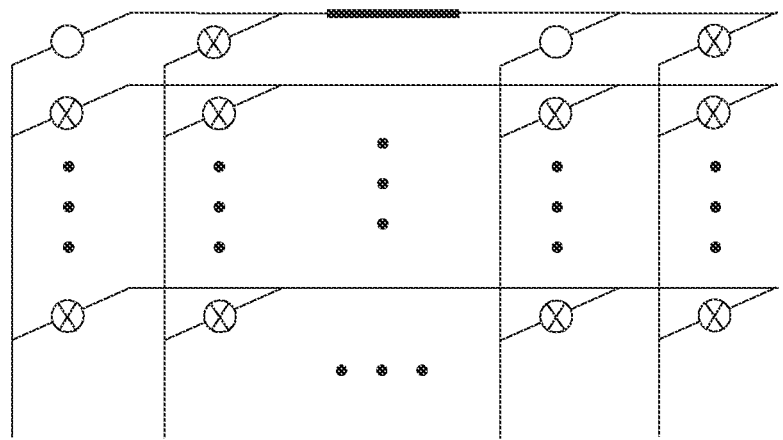
FIGS. 15d-15f illustrate another embodiment wherein once the exemplary liquid substance or material is sufficiently localized within the bus segment, the valve associated with the source port is closed and a propellant gas may be applied from another source port.
Figure 15E:
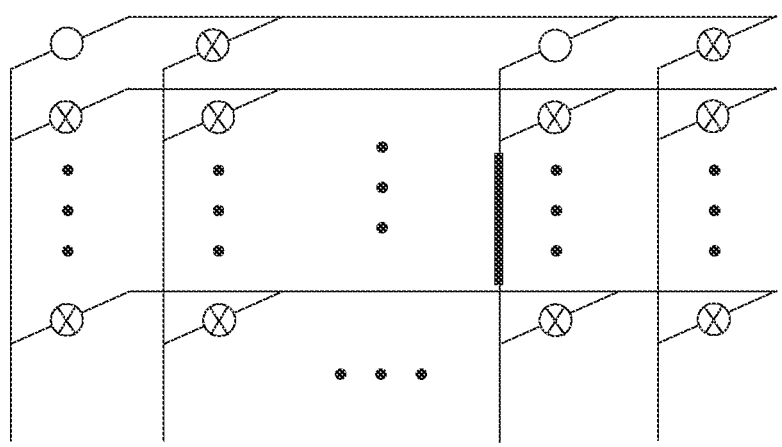
Figure 15F:
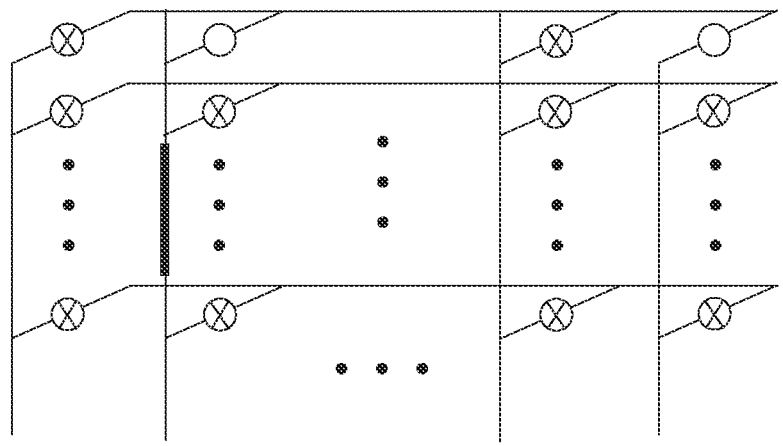

Throughout the burst transport depicted in FIGS. 15a-15c the two valves depicted as open circles are opened throughout. In another embodiment, when the exemplary liquid substance or material is sufficiently localized within the bus segment, the valve associated with the source port may be closed and a propellant gas may be applied from another source port, as depicted in FIGS. 15d-15e which replace FIGS. 15b-15c. In a similar fashion, as shown in FIG. 15f, a vacuum can be applied from another sink port rather than by the full transport path itself (as in the case in FIG. 15a).

Figure 16A:
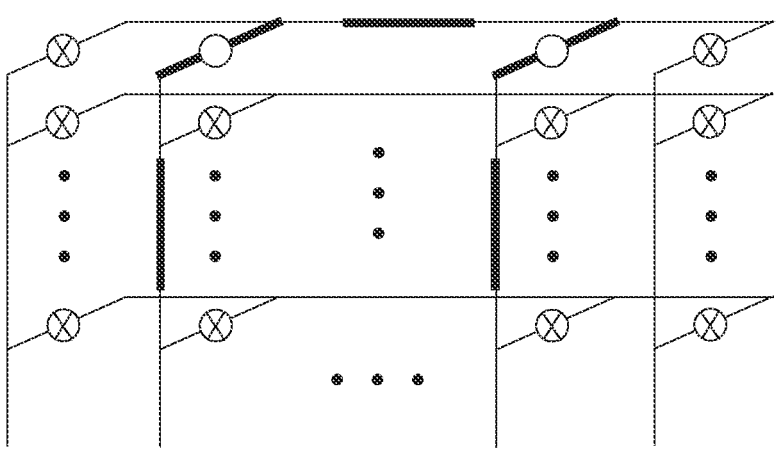
FIG. 16a shows an exemplary closely-spaced sequence of bursts of the same liquid substance or material.
Figure 16B:
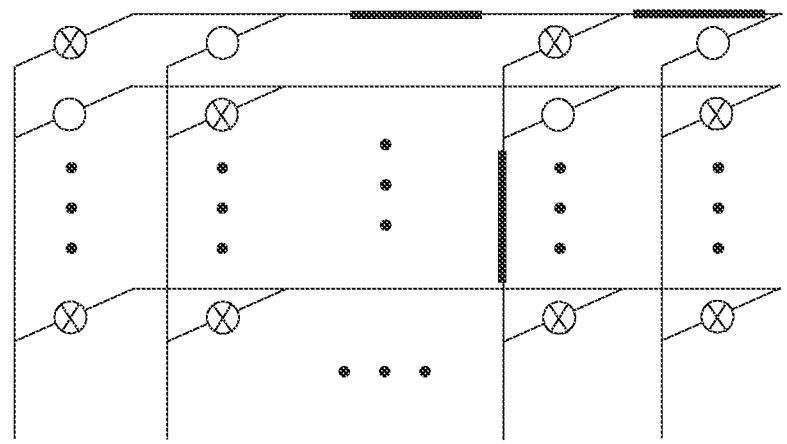
FIG. 16b depicts an alternate next step of this exemplary sequence wherein the destination port valve on the bus closes, allowing the flow to be directed to another destination via a now opened valve on the bus line while a burst segment destined for the original destination but remaining in-line can be delivered by introducing a propelling gas from another source port via another bus line and associated open valves.

FIG. 16a shows an exemplary closely-spaced sequence of bursts of the same liquid substance or material. Between each burst are gases or other neutral substances that do not affect the substance or material being transported. In one step of this exemplary sequence, the two valves depicted as open circles are opened throughout the full interval of the burst sequence. However, more sophisticated operations are also possible. For example, FIG. 16b depicts an alternate next step of this exemplary sequence where the destination port valve on the bus closes, allowing the flow to be directed to another destination via a now opened valve on the bus line. Meanwhile, a burst segment destined for the original destination but remaining in-line can be delivered by introducing a propelling gas from another source port via another bus line and associated open valves. By carefully choreographed timing, perhaps advantageously aided by the above noted sensors, the arrangement of FIG. 16b can be used to provide precisely-time pre-staged deliveries to multiple destination ports.

Figure 17:
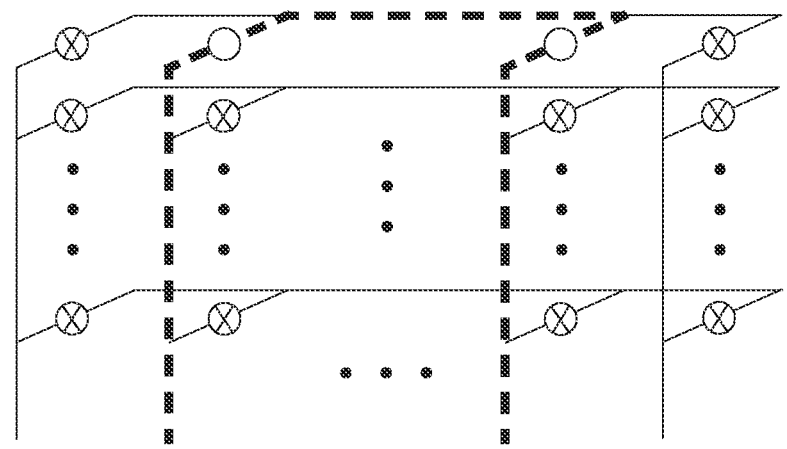
FIG. 17 shows stuttered bursts of liquid substance or material being transported.

FIG. 17 shows stuttered bursts of a liquid substance or material being transported. This technique can be useful in various ways, for example in operations such as titrations, or to impose pressure impacts in clearing and cleaning, or when the propelling gas is to be mixed together with the liquid substance or material, etc.

Figure 18A:
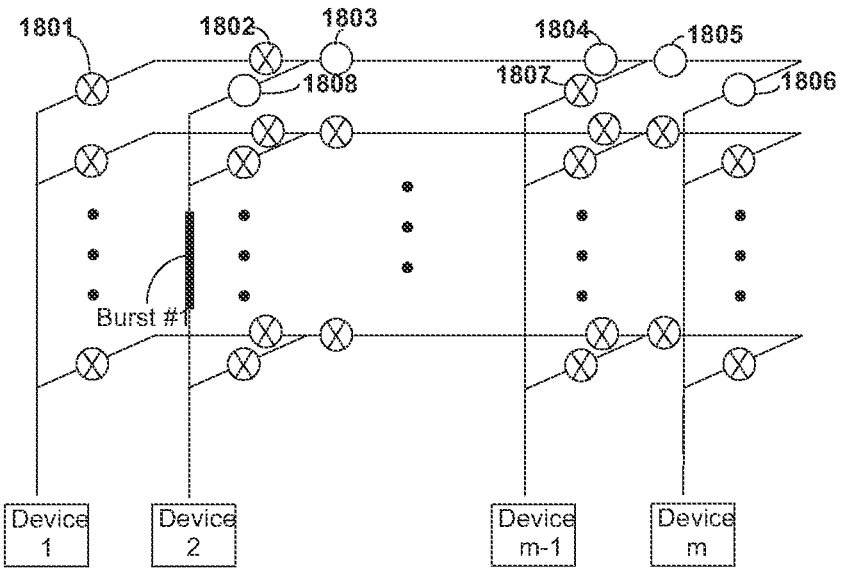
FIG. 18a shows a liquid substance or material burst (Burst #1) introduced by Device 2.

Next some of the concepts just introduced and variations of them will be viewed in the context of the operation of localization valves within the bus lines of a Multi-channel Chemical Transport Bus. As an example, FIG. 18a shows a burst of liquid substance or material, represented as Burst #1, introduced to the Multi-channel Chemical Transport Bus by Device 2. To direct the flow from Device 2 to Device 4, valves 1808, 1803, 1804, 1805 and 1806 are opened.

Figure 18B:
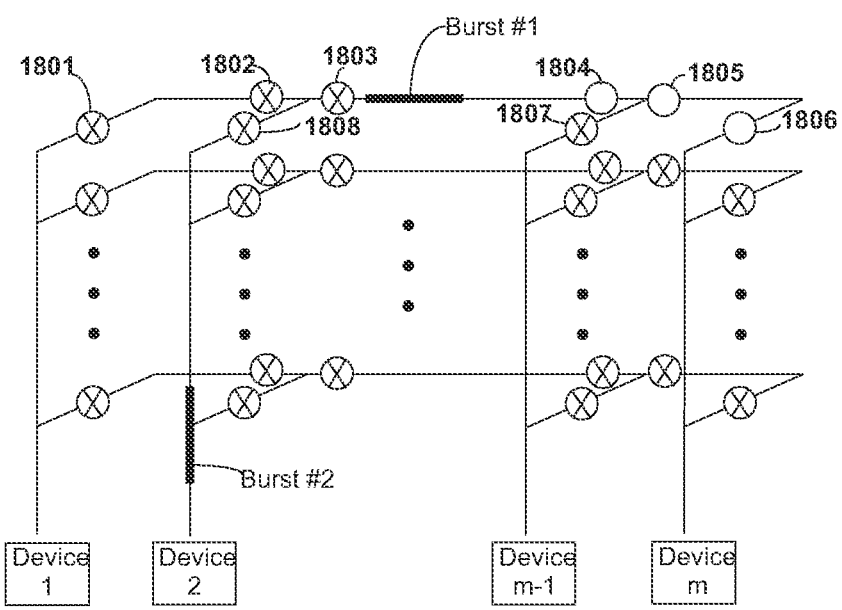
FIG. 18b shows Burst #1 continues moved into the top bus line.

FIG. 18b shows Burst #1 as it continues to move into the top bus line. In this figure we can observe that Burst #1 has already passed through valves 1808 and 1803 and these valves have been closed, trapping Burst #1 completely within a localized segment of the bus line. The valves where Burst #1 has not yet passed through remain open. Meanwhile, just before, a second burst, Burst #2, has been introduced by Device 2. Because of the closed valves, Burst #1 is also completely trapped in a localized segment.

Figure 18C:
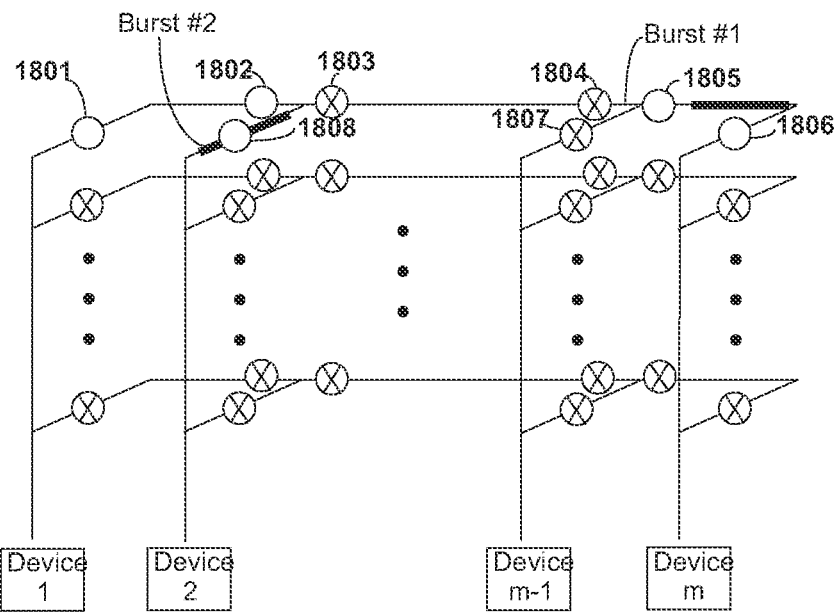
FIG. 18c shows both bursts traveling through the bus line.

Valves 1801-1803 can then open, allowing Device 1 to provide venting or propelling gas to allow Burst #1 to move at least approximately into the position depicted in FIG. 18c. Valves 1801-1803 then close prior to the time captured by FIG. 18c. In one embodiment, Device 1 propels Burst #1 with a pressure pulse sufficient to propagate it into Device m even after valve 1804 closes. In another embodiment, valve 1807 may open allowing Device m−1 to provide venting or propelling gas to allow Burst #1 to propagate it into Device m after valve 1804 closes. Additionally in FIG. 18c, valves 1808, 1802 and 1801 have been opened leading Burst #2 to Device 1.

Figure 18D:
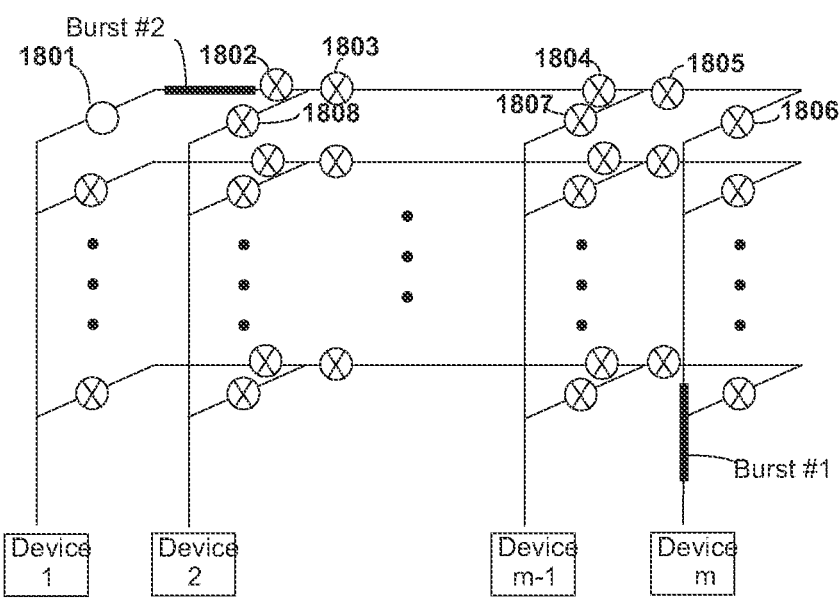
FIG. 18d shows Burst #1 now about to arrive at destination Device 4 and Burst #2 having already traversed several now-closed valves, confining it.

FIG. 18d shows Burst #1 now about to arrive at destination Device 4, leveraging momentum or extra imparted back pressure, despite all valves traversed in its travel thus far are now closed. FIG. 18d also shows the Burst #2 having already traversed several valves that are now closed, confining it. Valve 1801 remains open.

Figure 18E:
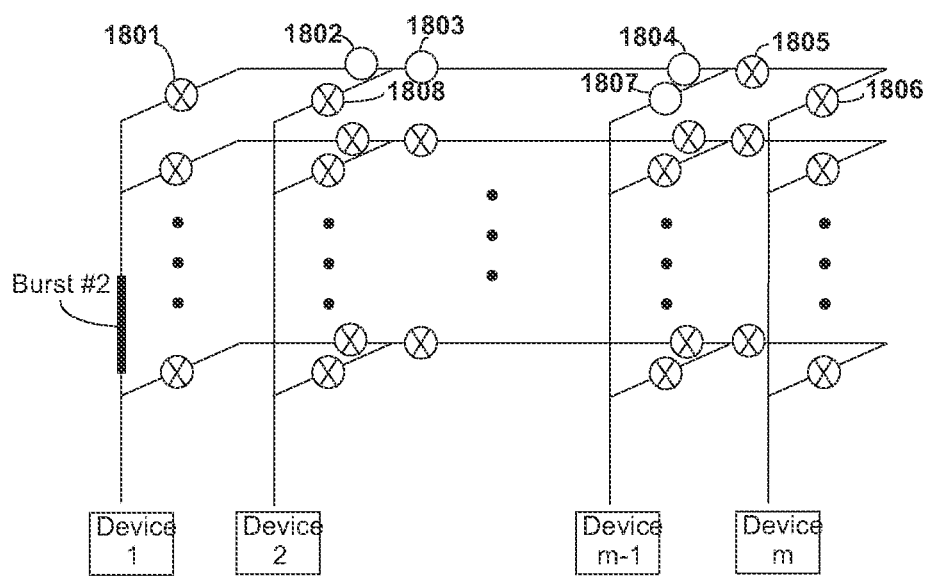
FIG. 18e shows Burst #2 arriving at its destination, allowed or driven to travel by venting or propelling gas provided by Device m−1 via several now opened valves.

FIG. 18e shows Burst #2 arriving at its destination, allowed or driven to travel by venting or propelling gas provided by Device m−1 via now opened valves 1801, 1802, 1803, 1804, and 1807.

Further Alternate Embodiments of a Multi-channel Chemical Transport Bus

Next, a number of exemplary alternate embodiments of a Multi-channel Chemical Transport Bus are provided, some leveraging aforementioned single-pole single-throw ("SPDT") valves.

Figure 19A:
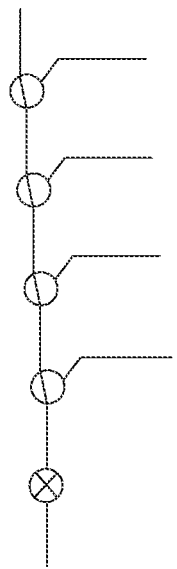
FIG. 19a shows a device port bus column where the on/off valves have been replaced with a cascade of SPDT valves.
Figure 19B:
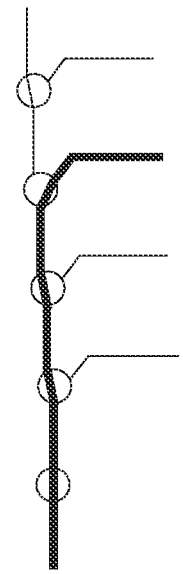

FIG. 19a shows a device port bus column where the on/off valves have been replaced with SPDT valves. This valve cascade arrangement allows passage or isolation when valve is turned on/off. The top portion of the device port bus column could connect to another valve, or to portions of a dedicated clearing and/or cleaning architecture. FIG. 19b shows an exemplary gated path through the port bus column of FIG. 19a, illustrating how the SPDT valves provide enhanced isolation against contamination as compared to the port bus column employed in FIG. 4.

Figure 19C:
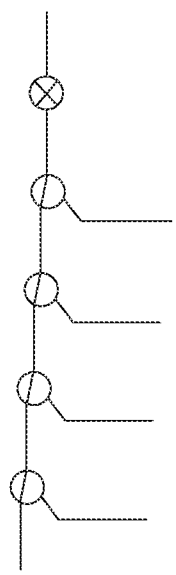
FIG. 19c shows when the arrangement shown in FIG. 19a is constructed in the opposite manner that can be used as a distribution valve readily amenable to clearing and cleaning.
Figure 19D:
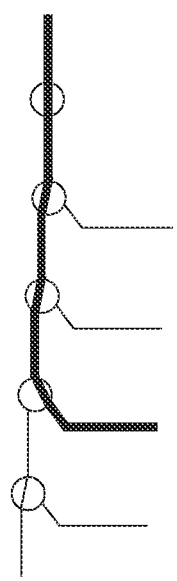
FIG. 19d shows an exemplary gated path through the arrangement of FIG. 19c.

FIG. 19c shows the arrangement in FIG. 19a as now being constructed in the opposite manner. In this arrangement the valve cascade can be used as a distribution valve readily amenable to clearing and cleaning. For example, the downward outlet at the bottom valve would be used as an evacuating drain. FIG. 19d shows an exemplary gated path through the arrangement of FIG. 19c.

Figure 20A:
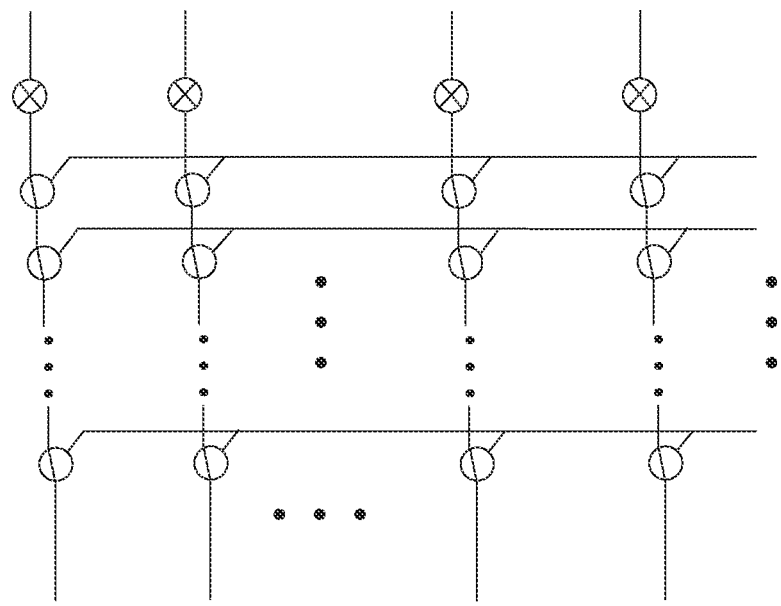
FIG. 20a depicts an exemplary alternate realization of a Multi-channel Chemical Transport Bus employing the valve cascade arrangement of FIG. 19a as the device port bus column.
Figure 20B:
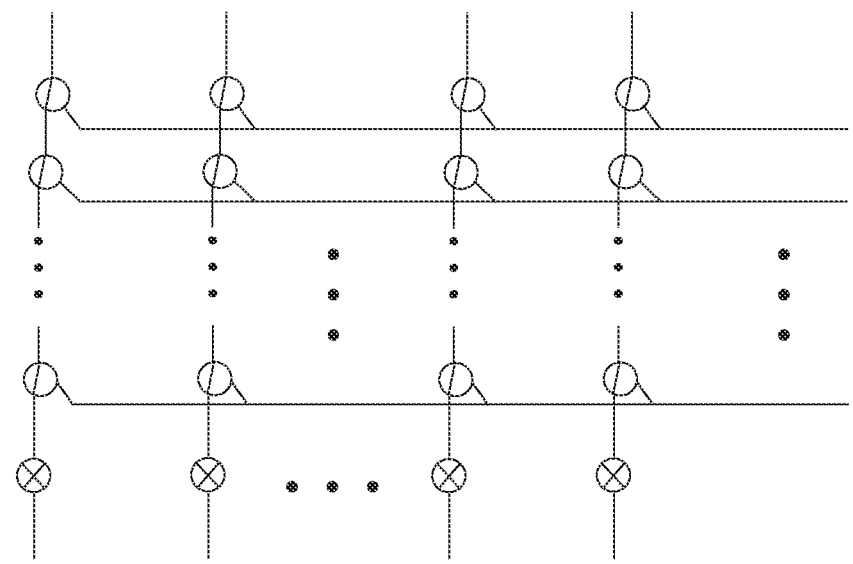
FIG. 20b depicts an exemplary alternate realization of a Multi-channel Chemical Transport Bus employing the valve cascade arrangement of FIG. 19c as the device port bus column.

FIG. 20a depicts an exemplary alternate realization of a Multi-channel Chemical Transport Bus employing the valve cascade arrangement of FIG. 19a as the device port bus column. FIG. 20b depicts an exemplary alternate realization of a Multi-channel Chemical Transport Bus employing the valve cascade arrangement of FIG. 19c as the device port bus column.

Figure 21A:
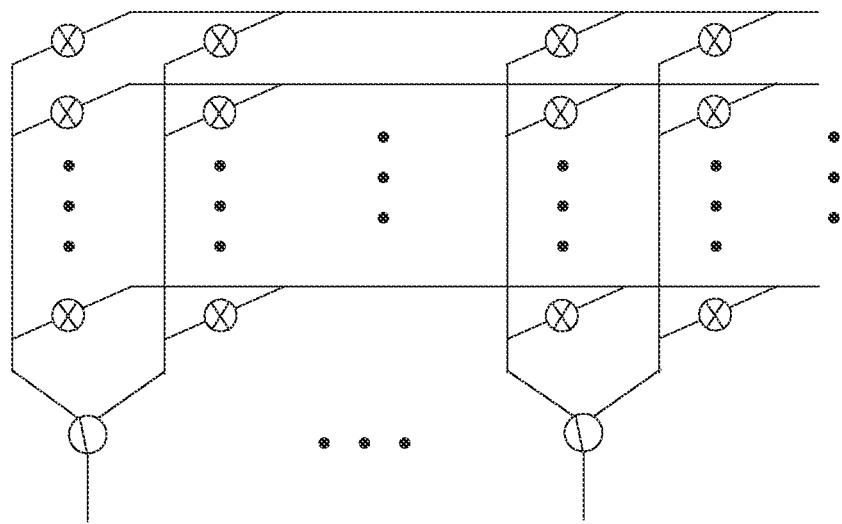
FIG. 21a depicts an exemplary expanded arrangement where each port is provided with a SDPT valve, the SDPT valve selecting between what would otherwise be two separate ports of the same Multi-channel Chemical Transport Bus.

FIG. 21a depicts an exemplary expanded arrangement where each port is provided with a SDPT valve, the SDPT valve selecting between what would otherwise be two separate ports of the same Multi-channel Chemical Transport Bus. Such an arrangement can be useful for rapid delivery via pre-staged transport, or to isolate when contamination, or as a redundant backup in case of failure.

Figure 21B:
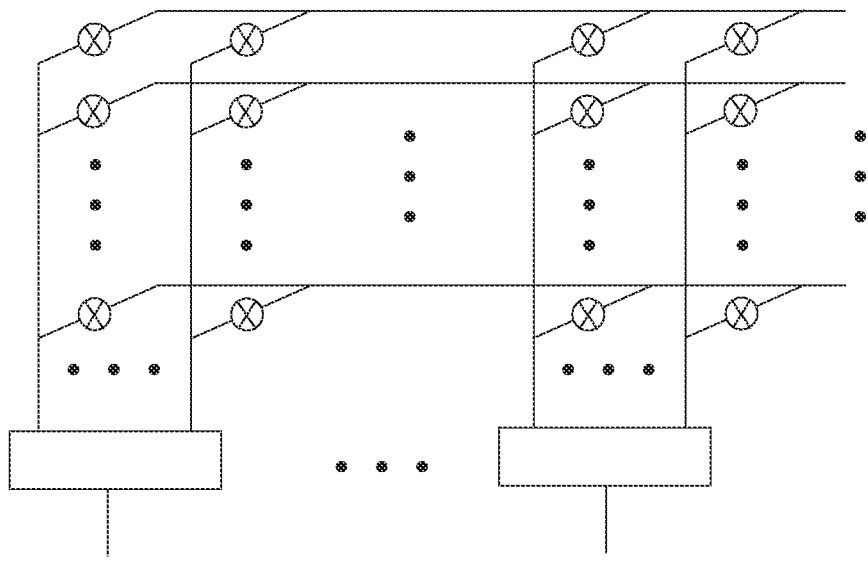
FIG. 21b shows a corresponding adaptation of FIG. 21a where the SDPT valves have been replaced with k-port mutually-exclusive selection or distribution valves where each of the k ports selects among what would otherwise be k separate ports of the same Multi-channel Chemical Transport Bus.

A SDPT valve may be viewed as a 2-port mutually-exclusive selection or distribution valve. Additionally, there are many widely known implementations at various physical scales (including scales relevant to LoC systems) of k-port mutually-exclusive selection or distribution valves wherein k>2 (for example, employing a rotary element). FIG. 21b shows a corresponding adaptation of FIG. 21a where the SDPT valves have been replaced with k-port mutually-exclusive selection or distribution valves where each of the k ports selects among what would otherwise be k separate ports of the same Multi-channel Chemical Transport Bus.

Figure 22A:
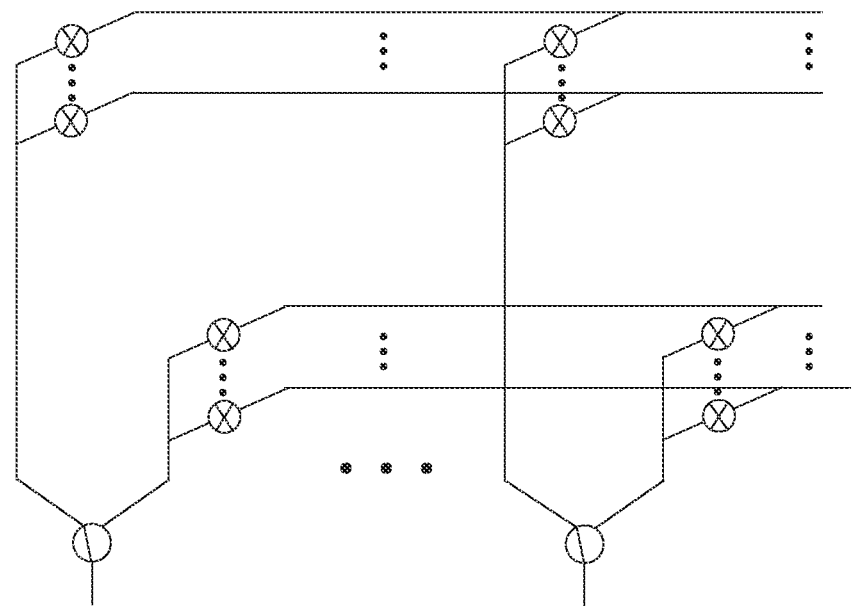
FIG. 22a shows the arrangement of FIG. 21a where the two ports of the SPDT valve are connected to what would otherwise be the output ports of two separate Multi-channel Chemical Transport Busses.

FIG. 22a shows the arrangement of FIG. 21a where the two ports of the SPDT valve are connected to what would otherwise be the output ports of two separate Multi-channel Chemical Transport Busses. This arrangement would be used to cut down the number of valves needed in some large-scale system, and may also be used to prevent or localize contaminations.

Figure 22B:
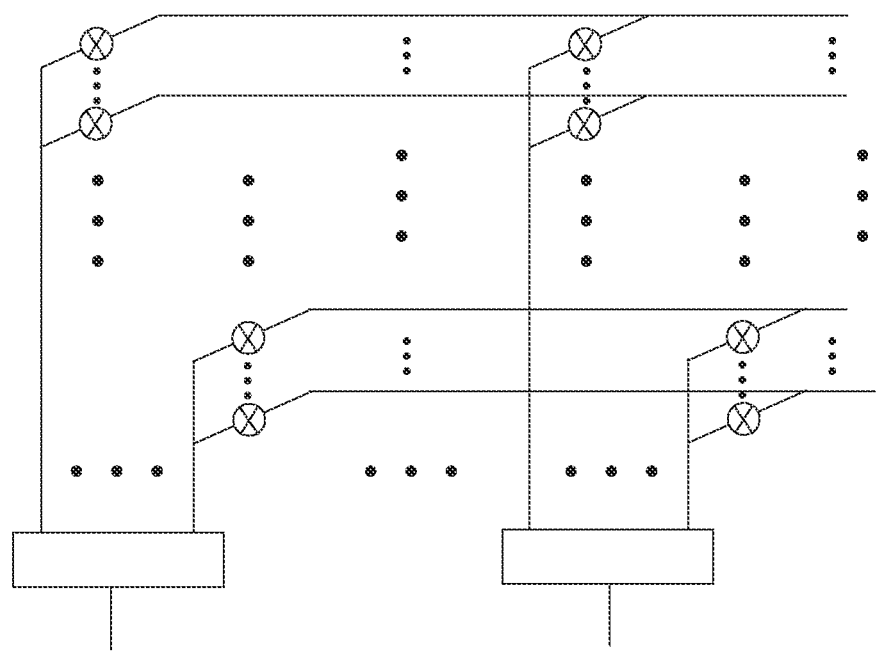
FIG. 22b shows an arrangement of FIG. 21b where each of the k ports connected to what would otherwise be the output ports of k separate Multi-channel Chemical Transport Busses.
Figure 23:
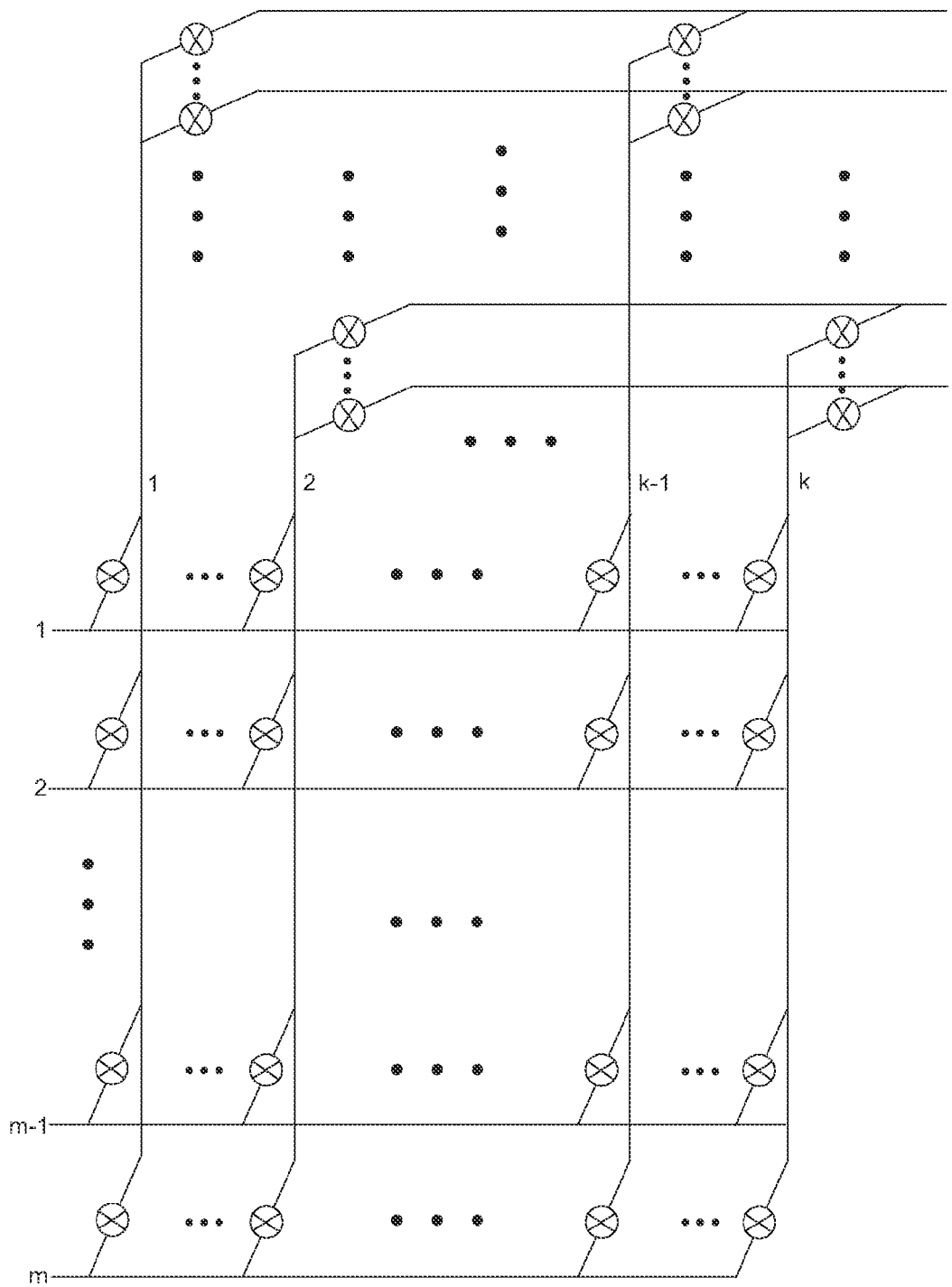
FIG. 23 shows an exemplary implementation of FIG. 22b using only on/off valves.

Similarly, FIG. 22b shows an arrangement of FIG. 21b where each of the k ports connected to what would otherwise be the output ports of k separate Multi-channel Chemical Transport Busses. FIG. 23 shows an exemplary implementation of FIG. 22b using only on/off valves.

Clos, Banyan, and Related Routing Architectures

In communications systems, it is known that the now-classical Clos, Banyan, and other related switch architectures can be used under various conditions to reduce the switch-element count. An embodiment of the invention provides for the topology of Clos, Banyan, and other related switch architectures to be adapted for use in implementing a Multi-channel Chemical Transport Busses to reduce valve element count and/or provide specific interface, layout, fabrication, redundancy or performance features. For instance, the system may be configured to include a Clos network topology that is adapted to chemical flow paths While the invention has been described in detail with reference to disclosed embodiments, various modifications within the scope of the invention will be apparent to those of ordinary skill in this technological field. It is to be appreciated that features described with respect to one embodiment typically may be applied to other embodiments. Therefore, the invention properly is to be construed with reference to the claims.

I claim:

1. An electrically-operated multi-channel chemical transport bus system, the system comprising:
    a plurality of microfluidic flow lines, each flow line connected to a respective flow port;
    a plurality of microfluidic bus lines, each bus line connecting to at least two flow lines selected from the plurality of flow lines, wherein each bus line is only connected to a flow port through a flow line selected from the plurality of flow lines;
    a plurality of electrically operated connecting valves connecting each of the flow lines to each of the bus lines, wherein each connecting valve is connected to one flow line and one bus at associated taps;
    at least one sensor associated with at least one of the flow lines, wherein the at least one sensor is located along a bus line segment between the associated tap and the associated flow port; and
    a controller connected to the at least one sensor, wherein the controller selectively operates each of the plurality of connecting valves, wherein the controller controls the connecting valves to selectively enable communication between a first flow port and a second flow port and disable communication between a third flow port and both of the first and second flow ports in a first configuration, and
    wherein the controller controls the connecting valves to selectively enable communication between a third flow port and the first flow port and disable communication between the second flow port and both of the first flow port and the third flow port.

2. The system of claim 1 wherein at least one of the connecting valves is a single-pole double-throw valve.

3. The system of claim 1 wherein the controller controls the connecting valves to selectively enable and disable communication among the first flow port, the second flow port and at least a third flow port.

4. The system of claim 1 wherein the controller provides a clearing mode to clear remnants of a chemical flow.

5. The system of claim 1 wherein the system comprises a Clos network topology adapted to chemical flow paths.

6. The system of claim 1 wherein the system comprises a Banyan network topology adapted to chemical flow paths.

7. The system of claim 1, further comprising a plurality of electrically operated isolation valves disposed in the flow lines to isolate connections of at least one of the connecting valves.

8. The system of claim 1 wherein the at least one sensor is a presence sensor.

9. The system of claim 1 wherein the at least one sensor is a flow sensor.

10. The system of claim 1 wherein the at least one sensor is a pressure sensor.

11. The system of claim 1 wherein the at least one sensor is a temperature sensor.

12. The system of claim 1 wherein the at least one sensor is a conductivity sensor.

13. The system of claim 1 wherein the at least one sensor is an optical sensor.

14. The system of claim 1 wherein the at least one sensor is an ion sensor.

15. The system of claim 1 wherein the at least one sensor is an affinity sensor.

16. The system of claim 1, wherein the at least one sensor is configured to detect a rate of flow of a fluid flowing in the associated flow line.

17. The system of claim 1, wherein the at least one sensor is configured to detect presence of a substance in the associated flow line.

18. An electrically-operated multi-channel chemical transport bus system, the system comprising:
    a plurality of microfluidic flow lines, each flow line connected to a respective flow port;
    a plurality of microfluidic bus lines, each bus line connecting to at least two flow lines selected from the plurality of flow lines, wherein each bus line is only connected to a flow port through a flow line selected from the plurality of flow lines;
    a plurality of electrically operated connecting valves connecting each of the flow lines to each of the bus lines, wherein each connecting valve is connected to one flow line and one bus at associated bus line taps;

a plurality of sensors associated with at least one of the flow lines, wherein the at least two of the plurality of sensors are placed on either proximate side of a respective one of the bus line taps; and a controller connected to the at least one sensor, wherein the controller selectively operates each of the plurality of connecting valves, wherein the controller controls the connecting valves to selectively enable communication between a first flow port and a second flow port and disable communication between a third flow port and both of the first and second flow ports in a first configuration, and wherein the controller controls the connecting valves to selectively enable communication between a third flow port and the first flow port and disable communication between the second flow port and both of the first flow port and the third flow port.

* * * * *